US012705326B2

(12) United States Patent
Soliman

(10) Patent No.: US 12,705,326 B2
(45) Date of Patent: Aug. 11, 2026

(54) BIOMETRIC AUTHENTICATION SYSTEM

(71) Applicant: Abdallah Sadek Soliman, Lanham, MD (US)

(72) Inventor: Abdallah Sadek Soliman, Lanham, MD (US)

( * ) Notice: Subject to any disclaimer, the term of this patent is extended or adjusted under 35 U.S.C. 154(b) by 0 days.

(21) Appl. No.: 19/204,519

(22) Filed: May 10, 2025

(65) Prior Publication Data

US 2025/0348569 A1 Nov. 13, 2025

Related U.S. Application Data

(60) Provisional application No. 63/645,809, filed on May 10, 2024.

(51) Int. Cl.

*G06F 21/00* (2013.01)
*G06F 21/32* (2013.01)
*G06F 21/35* (2013.01)

(52) U.S. Cl.

CPC .............. *G06F 21/32* (2013.01); *G06F 21/35* (2013.01)

(58) Field of Classification Search

CPC ................................. G06F 21/32; G06F 21/35
See application file for complete search history.

(56) References Cited

U.S. PATENT DOCUMENTS

| | | | |
|---|---|---|---|
| 1,868,179 A | 7/1932 | Small | |
| 9,942,222 B1 * | 4/2018 | Fenton | H04L 63/0853 |
| 10,146,921 B2 | 12/2018 | Rice et al. | |
| 10,659,456 B2 | 5/2020 | Vanoni et al. | |
| 11,694,497 B2 | 7/2023 | Parthasarathi et al. | |
| 11,860,988 B1 | 1/2024 | Baker et al. | |
| 11,863,543 B2 | 1/2024 | Griffin | |
| 11,868,178 B2 | 1/2024 | Badinski et al. | |
| 2015/0220109 A1 * | 8/2015 | von Badinski | A61B 5/021 368/10 |
| 2015/0310444 A1 * | 10/2015 | Chen | G06Q 20/308 705/44 |
| 2016/0034742 A1 * | 2/2016 | Kim | G06F 21/35 382/124 |

(Continued)

FOREIGN PATENT DOCUMENTS

| | | |
|---|---|---|
| CN | 104767760 A | 7/2015 |
| WO | 2017-003078 A1 | 1/2017 |
| WO | 2024-071328 A1 | 4/2024 |

OTHER PUBLICATIONS

Yang, Jeong Rok; International Search Report; Sep. 11, 2025; 3 pages; KIPO.
Yang, Jeong Rok; Written Opinion of the International Searching Authority; Sep. 11, 2025; 6 pages; KIPO.
Gao et al.; A photoacoustic patch for three-dimensional imaging of hemoglobin and core temperature; Journal; Dec. 15, 2022; 13 pages; Nature Communications.

(Continued)

*Primary Examiner* — William A Corum, Jr.
(74) *Attorney, Agent, or Firm* — Adibi IP Group, PC; Amir V. Adibi; Kian Tanner

(57) ABSTRACT

A biometric authentication system is disclosed. In one embodiment, a method includes detecting an interaction between a biometric authentication device and an external system, generating biometric information of a device wearer using a biometric sensor of the biometric authentication device, comparing the biometric information of the device wearer to stored biometric information, and transmitting to the external system an authentication result based on the comparison of the biometric information of the device wearer to the stored biometric information.

20 Claims, 27 Drawing Sheets

INITIATING USER AUTHENTICATION

(56) References Cited

U.S. PATENT DOCUMENTS

| | | | | |
|---|---|---|---|---|
| 2017/0323141 | A1 | 11/2017 | Lee et al. | |
| 2018/0234415 | A1* | 8/2018 | Fukuda | H04W 12/33 |
| 2020/0085360 | A1* | 3/2020 | Yuan | A61B 5/14552 |
| 2020/0391696 | A1* | 12/2020 | Kato | G06V 40/10 |
| 2021/0183235 | A1 | 6/2021 | Giobbi et al. | |
| 2022/0398581 | A1 | 12/2022 | Jung et al. | |
| 2023/0084042 | A1 | 3/2023 | Durak et al. | |
| 2023/0094432 | A1 | 3/2023 | Momo et al. | |
| 2023/0135499 | A1 | 5/2023 | Lim | |
| 2023/0143293 | A1* | 5/2023 | Sanchez | H04L 9/3231 713/186 |
| 2023/0209355 | A1* | 6/2023 | Nam | G01S 7/006 455/456.1 |
| 2023/0217210 | A1 | 7/2023 | Russell et al. | |
| 2024/0004981 | A1 | 1/2024 | Badri et al. | |
| 2024/0008775 | A1 | 1/2024 | Jung | |
| 2025/0111029 | A1* | 4/2025 | Frohman | H04W 12/06 |
| 2025/0221635 | A1 | 7/2025 | Sushita et al. | |

OTHER PUBLICATIONS

Logical Access Control; Webpage; https://www.hitachi.com/products/it/veinid/products/logical_access.html; Hitachi.

CSS Group Biometrics Fastvein; Video; Nov. 20, 2014; https://www.youtube.com/watch?v=1-levMKgASM; Croma Security Solutions Group PLC.

Toru et al.; Millimeter-Precision Ultrasonic DSSS Positioning Technique With Geometric Triangle Constraint; Journal; Jul. 11, 2022; 12 pages; IEEE.

Zhan et al.; 3D finger vein biometric authentication with photoacoustic tomography; Journal; Oct. 1, 2020; 8 pages; Applied Optics.

Shah et al.; VID: Human identification through vein patterns captured from commodity depth cameras; Journal; Feb. 21, 2021; 21 pages; The Institution of Engineering and Technology.

Ling Jin; Using Deep Learning for finger-vein based biometric authentication; Article; May 6, 2019; 17 pages; Towards Data Science Medium.

* cited by examiner

BIOMETRIC AUTHENTICATION SYSTEM

BIOMETRIC AUTHENTICATION DEVICE $S_{t(x,y)}$ = SENSOR TYPE $P_{i,j}$ = PADDING/SPACE

BIOMETRIC SENSING ARRAY

TOP VIEW ROTATABLE MIDDLE RING

TOP VIEW RING ASSEMBLY

SENSOR ARRAY MODES

WIRELESS CHARGING CIRCUIT

BIOMETRIC CALIBRATION

AUTHENTICATION

INITIATING CALIBRATION

INITIATING USER AUTHENTICATION

PID LIFE CYCLE

AUTHENTICITY

SECURE BOOT

SECURE PAIRING

CID STATE

CID SETUP

PID DETECTION

PID STATE

PID SETUP

FIXED RING
EXPLODED VIEW

HARDWARE ARCHITECTURE

SOFTWARE ARCHITECTURE

NETWORK ARCHITECTURE - STRICT NETWORK

NETWORK ARCHITECTURE - SEMI-RELAXED NETWORK

NETWORK ARCHITECTURE - RELAXED NETWORK

SENSOR FUSION

SENSOR FUSION - RTLS EMBODIMENT

BIOMETRIC AUTHENTICATION SYSTEM

CROSS REFERENCE TO RELATED APPLICATIONS

This application claims the benefit under 35 U.S.C. § 119 from U.S. Provisional Patent Application Ser. No. 63/645,809, entitled "Biometric Authentication System," filed on May 10, 2024, the subject matter of which is incorporated herein by reference.

TECHNICAL FIELD

The present invention relates generally to user authentication, and more specifically, to a biometric authentication system.

SUMMARY

A biometric authentication system is provided that utilizes vein imaging as a primary biometric identifier within a wearable device. In one embodiment, vein imaging is achieved through use of a novel rotating ring mechanism designed to capture vein images from multiple angles. Vein images are obtained using one or more biometric sensors that use photoacoustic tomography or other vein imaging techniques. The system also includes the integration of position sensing technology for proximity detection and incorporates additional security factors, such as blood oxygenation and blood flow detection. Each of these aspects demonstrates an innovative approach to authentication technology, combining advanced biometrics with user-centric design to create a secure, reliable, and convenient system for identity verification.

In one embodiment, a method includes detecting an interaction between a biometric authentication device and an external system, generating biometric information of a device wearer using a biometric sensor of the biometric authentication device, comparing the biometric information of the device wearer to stored biometric information, and transmitting to the external system an authentication result based on the comparison of the biometric information of the device wearer to the stored biometric information.

In one embodiment, a Client Interface Device (CID) operates as an interface for authenticating devices and facilitates single sign-on and proximity sensing. In operation, the CID continuously scans for signals, such as Bluetooth Low Energy (BLE) signals, specifically looking for advertising packets that match the characteristics of Personal Identification Devices (PIDs) associated with the biometric authentication system, also referred to as a Hybrid Omni-Authentication for Reliable User Security (HORUS) system.

Upon detecting a potential PID within a configurable proximity range, the CID initiates a cryptographic challenge-response protocol to verify the identity of the PID, ensuring it is a genuine HORUS device. The configurable proximity range allows the biometric authentication system to support various applications, including door access, firearm control, home automation, or any application requiring identity and position information. Depending on context, some applications are configured to require closer proximity as compared to other applications. In some embodiments, the PID will only respond to the cryptographic protocol sent from the CID if the PID recognizes the CID within a white list of known CIDs. This prevents a bad actor from tampering with or spoofing a CID to obtain information from a user's PID.

After confirming the device's identity, the CID checks against a list of known devices to verify if the PID is authorized for system interaction. This list is also referred to as a white list or authorization list and is similar to checking authorized keys in the Linux SSH protocol. This is needed because a PID will only auto-respond to authentication or identification requests from CIDs it is enrolled with. This filtering allows the authentication system to create a system or network boundary. Once verified and authenticated, the CID and PID establish a secure ranging protocol. This protocol enables the CID to accurately determine and track the location of the PID within the system's operational area.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings. Additional information on various embodiments, including how to make and use such embodiments, is provided in the attached document.

In various embodiments, a biometric authentication system, also referred to as a Hybrid Omni-Authentication for Reliable User Security (HORUS) system, provides a novel approach in the realm of personal and asset security. The system comprises two main components: an authentication device, also referred to as a Personal Identification Device (PID) and a client. The system is designed with stringent security principles at its core that aim to establish a new standard for personal identification and asset protection.

The system is built upon the following foundational principles, individuality, protection of Personal Identifying Information, and identification. In one embodiment, the PID is inherently personal and is irrevocably bound to a single individual for its entire lifecycle. In another embodiment, an End of Life (EOL) recycle process allows a user of the PID to initiate a revocation of credentials and destruction of the data on the secure partition, requiring new calibration and enrollment before use. In this way, the novel PID is safely recycled and calibrated for another user.

With respect to protection of Personal Identifying Information (PII): Secure and protected storage is paramount. The stored PII dataset is minimized to the absolute essentials required for system functionality. PII is strictly confined within the authentication ecosystem, prohibiting transmission, copying, or external transfer.

With respect to identification, the system provides identification that is deterministic, unambiguous, precise, accurate, and binary (pass/fail classification).

Figure 1:
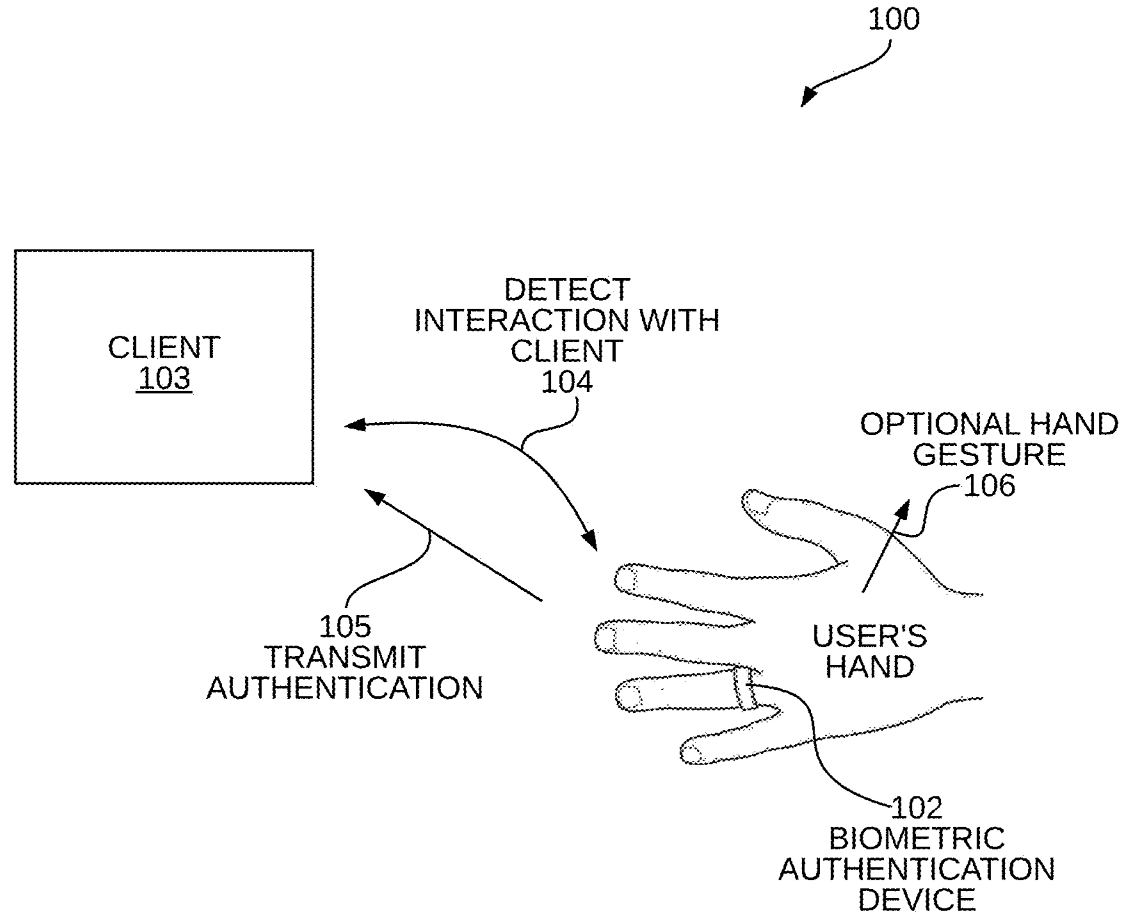
FIG. 1 shows an embodiment of a biometric authentication system that includes a Personal Identification Device (PID).

FIG. 1 shows an embodiment of a biometric authentication system 100 that includes a biometric authentication device 102. The system 100 operates to authenticate a user during interactions with a client 103. The client 103, depending on the specific user needs and hardware compatibility, can manifest as a software-only solution or may require additional hardware components.

The biometric authentication system 100 introduces an authentication interface, akin to OAuth2, facilitating third-party authentication. The biometric authentication system 100 incorporates two primary authentication factors: proximity/distance and biometrics. Specifically, the system 100 leverages proximity sensing technology for precise distance measurements and vein imaging for biometric verification. Position sensing is performed via one or more of Wi-Fi, Bluetooth, Ultra-Wideband (UWB), Ultrasonic Positioning, Thermal and Magnetic Positioning, or other suitable position sensing methods. For additional information on position sensing and vein imaging techniques, including how to construct and use an ultrasonic millimeter precision sensor and how to generate and obtain vein images for biometric identification, see U.S. Provisional Patent Application No. 63/645,809, entitled "Biometric Authentication System," filed on May 10, 2024, by Soliman (the entire subject matter of the foregoing patent document is hereby expressly incorporated by reference). In one embodiment, the form factor of the authentication device 102 is a ring, however, it should be noted that the design is adaptable to various form factors conducive to effective vein imaging and user convenience.

In one embodiment, the system 100 uses ultrasonic sensing to perform millimeter-precision positioning. In certain implementations, ultrasonic sensing techniques yield significant advantages, including PCB space reduction, cost savings, and precision. For example, in some applications, an ultrasonic sensor is used for both sensing biometric information and for positioning thereby eliminating the need for a dedicated and separate positioning sensor. The ultrasonic sensor tends to be cheaper than other types of sensors. In addition, the ultrasonic sensor provides millimeter precision, such as in the case of ultrasonic direct sequence spread spectrum (DSSS) sensors.

Use of millimeter precision proximity sensing provides applicability in environments requiring high precision, such as in training manufacturing robotics. For example, an operator wearing the device performs actions manually which are recorded by a training application. Collected data position data of the operator is converted to a different coordinate reference frame and used to program a machine to replicate the actions. This technique provides efficient integration of robotic manufacturing techniques to conventional production lines.

Users procure a PID device, which is calibrated during an initial setup to capture and store biometric data in a secure partition of the device. Initial calibration is a one-time process, securely recording the user's biometric data. Continuous adaptive calibration is proposed to account for natural variations in biometric data over time, ensuring consistent and accurate identification.

In operation, an authentication process initiates automatically when the PID is within a predefined proximity to the Client, which in one embodiment is facilitated by UWB technology. For enhanced security scenarios, an additional user verification step can be introduced, requiring a user-specific gesture or input to proceed.

The PID continually validates the user's identity against the stored biometric data, maintaining stringent security standards and user convenience. The result of the validation is a binary authentication result that is either positive or negative. In one embodiment, the authentication result along with timestamps and security tokens are securely communicated to the Client, ensuring a robust and tamper-resistant authentication ecosystem.

As illustrated in FIG. 1, the user wears the PID 102 comprising a ring or other wearable device. The PID 102 is configured to capture and store biometric information, such as vein images of the user's finger that can be used to authenticate the user. The user controls various operational modes of the PID 102, such as power on/off, calibration, initialization, and activation. In one embodiment, modes of the PID 102 are controlled by the user performing optional hand gestures 106.

The PID 102 detects interaction with the client 104. The interaction comprises proximity detection or receipt of wireless transmissions. When a desired interaction is detected, the PID 102 authenticates the user by capturing biometric data in real-time and comparing the newly captured data with stored data. When the new and stored biometric data matches, the PID 102 transmits a positive authentication result to the client 103. When the new and stored biometric data does not match, the PID 102 transmits a negative authentication result to the client 103. Thus, the PID 102 provides a simple, easy to wear authentication device that authenticates a user to a client.

Figure 2:
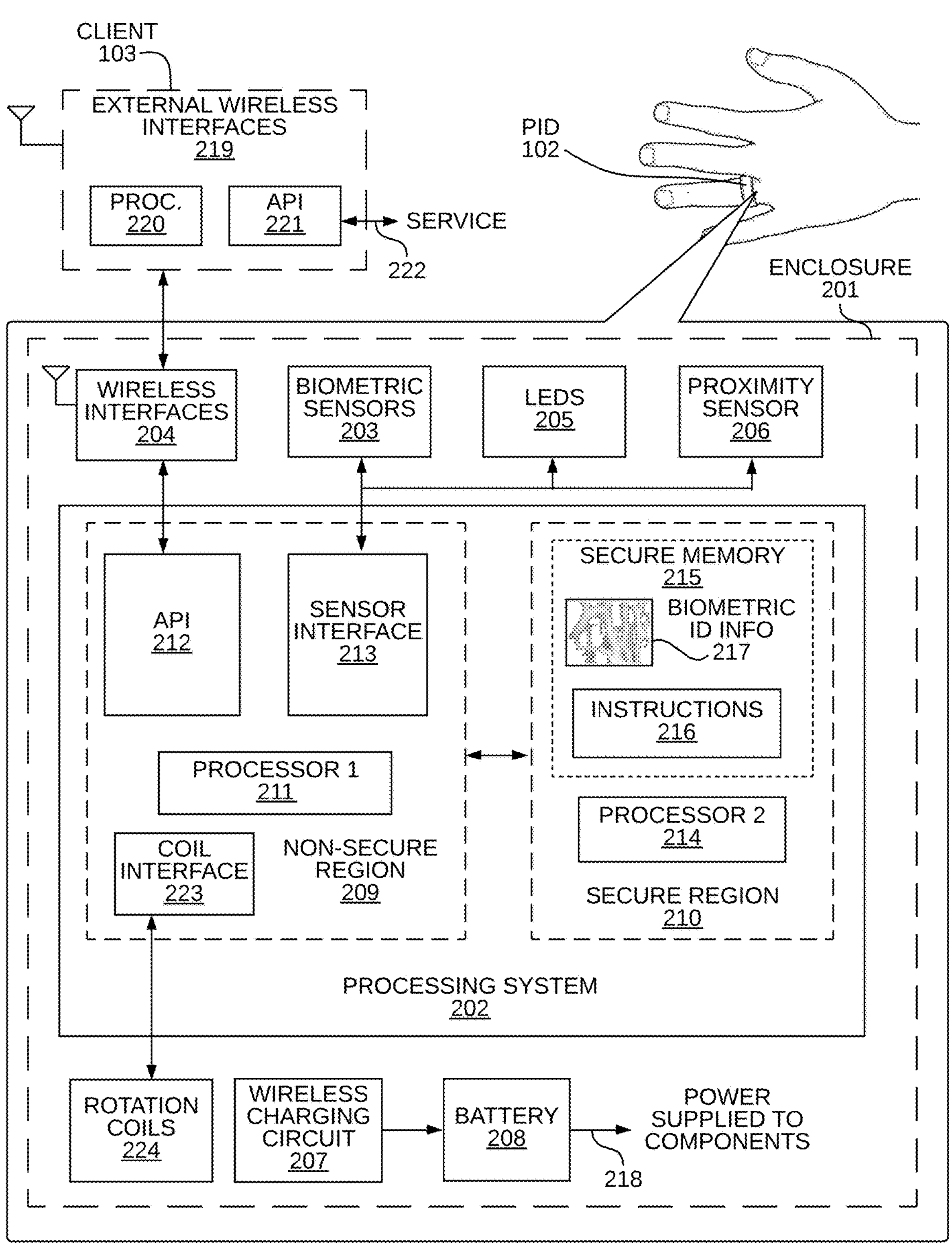
FIG. 2 shows a detailed embodiment of the PID shown in FIG. 1.

FIG. 2 shows a detailed embodiment of the PID 102 shown in FIG. 1. The PID 102 comprises an enclosure 201 that houses a processing system 202, biometric sensor 203, wireless interfaces 204, LEDs 205, proximity sensor 206, and rotation coils 224. The PID 102 also includes a wireless charger circuit 207 and a battery 208 that supplies power 218 to components of the PID 102.

In one embodiment, the processing system 202 comprises a non-secure region 209 and a secure region 210. The non-secure region 209 comprises an application program interface (API) 212, a sensor interface 213, a coil interface 223, and a first processor 211. The secure region 210 comprises a second processor 214, and a secure memory 215. The secure memory 215 stores user biometric identification information 217 and instructions 218.

FIG. 2 also shows the client 103 comprising an external wireless interface 219 having an optional processor 220 and API 221. The interface 219 obtains the authentication result from the PID 102 and passes this result 222 to any service that requires the user to be authenticated.

In operation, a user wears the PID on a finger and performs a calibration procedure that captures and securely stores a vein pattern of the user's finger. In one embodiment, the processor 211 executes the instructions 216 to control the rotation coils 224 through the coil interface 223 to rotate the biometric sensors 203 and the LEDS 205 to capture vein pattern images of the user's finger. The coil interface is used to control the exact position of the biometric sensors 203 and the LEDS 205. The vein pattern is then transmitted to the processor 214 which stores the biometric information 217 in the secure memory 215.

In one embodiment, when the proximity sensor 206 detects the presence of the client 103, the processor 211 performs the operations described above to capture more biometric information of the user's finger. This newly captured information is transmitted to the processor 214, which does a comparison with the stored biometric information to determine whether or not there is a match. A positive authentication result is determined if there is a match and a negative authentication result is determined if there is not a match. The processor 214 then transmits the authentication result to the processor 211, which uses the API 212 and wireless interfaces 204 to communicate the authentication result to the client 103.

Figure 3:
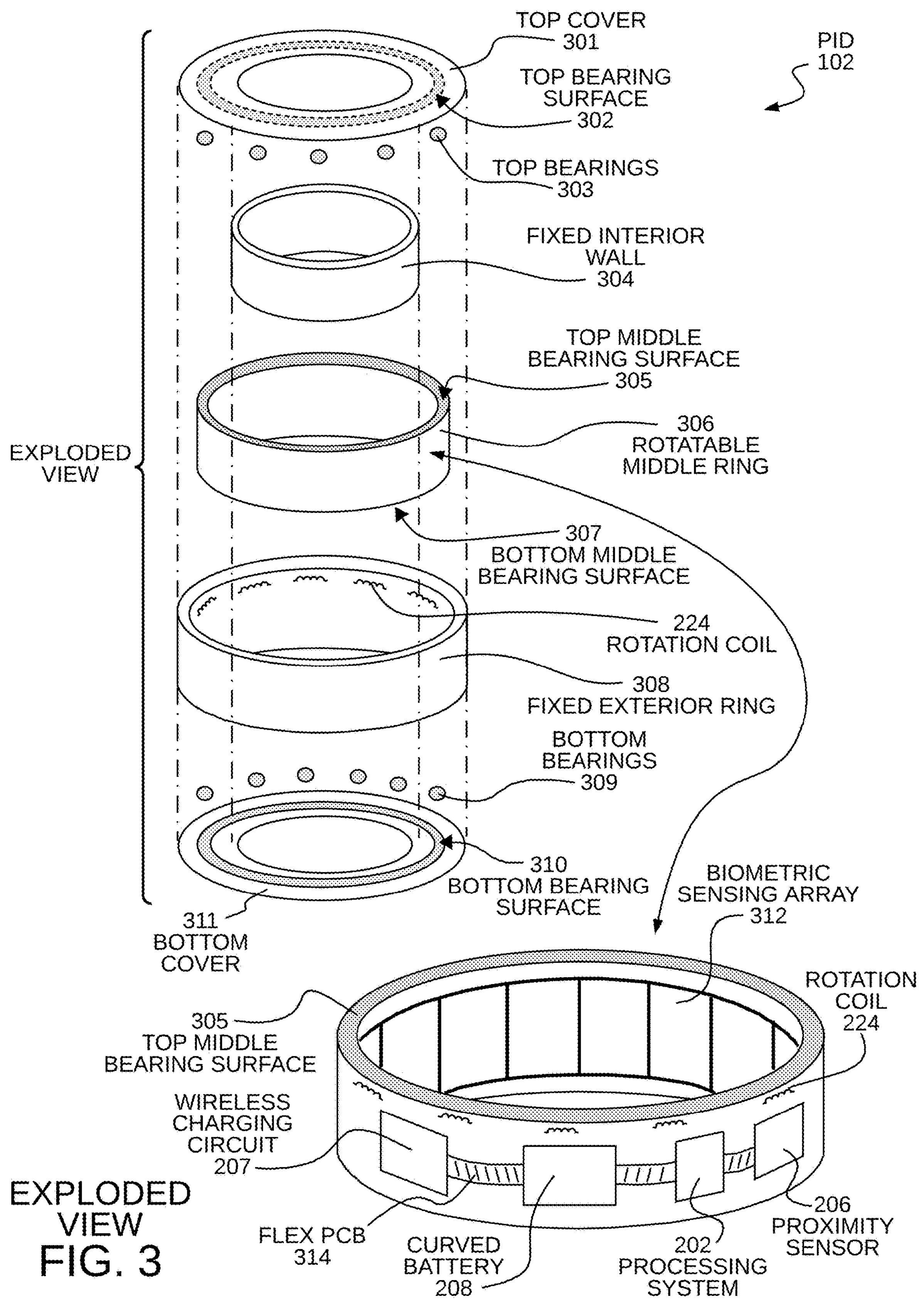
FIG. 3 shows an exploded view of the PID shown in FIGS. 1-2.

FIG. 3 shows an exploded view of the PID 102 shown in FIGS. 1-2. In one embodiment, the PID 102 comprises a top cover 301 having a top bearing surface 302 located on the bottom side of the top cover 301. The PID 102 also comprises top ball bearings 303, a fixed interior wall 304, and a rotatable middle ring 306 having a top middle bearing surface 305 and a bottom middle bearing surface 307. The top ball bearings are captured between and in contact with the top bearing surface 302 and the top middle bearing surface 305. The PID 102 also comprises a fixed exterior ring 308 having rotation coils 224, bottom bearings 309, and a bottom cover 311. The bottom bearings 309 are captured between and in contact with the bottom middle bearing surface 307 and a bottom bearing surface 310 that is located on a top side of the bottom cover 311.

FIG. 3 also shows an enlarged view of the rotatable middle ring 306, which shows the wireless charging circuit 207, battery 208, and processing system 202 attached to an outer surface of the rotatable middle ring 306. A flexible printed circuit board (PCB) 314 is connected between the wireless charging circuit 207, battery 208, and processing system 202, to provide electrical connections on which signals flow. The rotatable middle ring 306 also includes a biometric sensing array 312 attached to an inner surface of the rotatable middle ring 306. Rotation coils 224 are used to control the rotation of the rotatable middle ring 306 with respect to the fixed exterior ring 308.

Figure 3B:
FIG. 3B shows an embodiment of a biometric sensing array for use within a PID
Figure 3B:
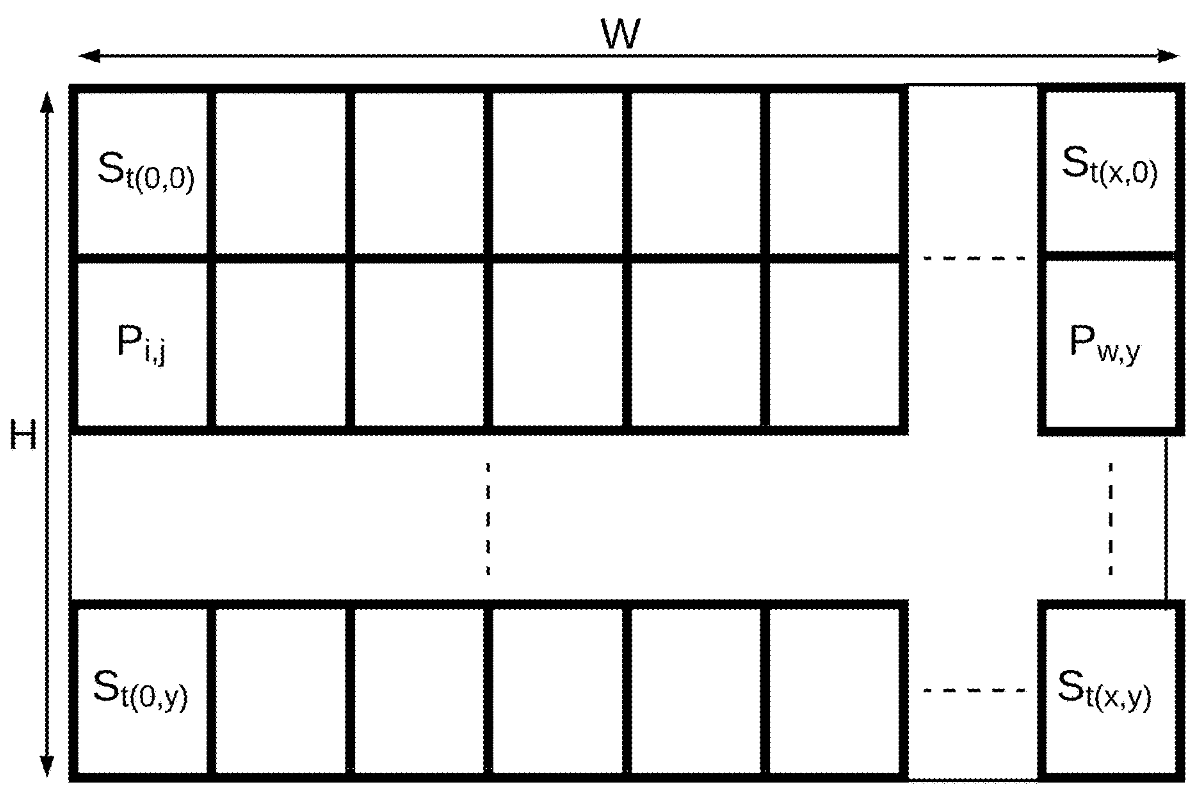

FIG. 3B shows an embodiment of a biometric sensing array 312 for use within a PID. For example, in one embodiment, the biometric sensing array 312 is mounted on the inner surface of the rotatable middle ring 306 of the PID 102. The biometric sensing array is defined by the following parameters.

H—Height of the array

W—Width of the array

S—Set of sensor types comprising: thermal, magnetic, acoustic, optical, and null.

C—Ring circumference.

d—Ring diameter, where ($C=\pi d$).

$S_{t(i,j)}$—is a sensor in the array, where t is the sensor type, i is the horizontal location index, and j is the vertical location index.

$P_{(i,j)}$—is a padding/space location in the array.

In one embodiment, the biometric sensor array is defined as a two-dimensional (2D) matrix projected onto the curved interior of the rotatable middle ring 306. For example, assuming the rotatable middle ring 306 is cut and flattened, a portion of the biometric sensor array having height H and with W can be attached to the flattened interior surface. In this embodiment, $W<C$ and $H<M$ where M is the width of the rotatable middle ring 306. In one embodiment, the matrix is homogeneous, but this is not a requirement as in other embodiments the matrix may be non-homogeneous.

Figure 4:
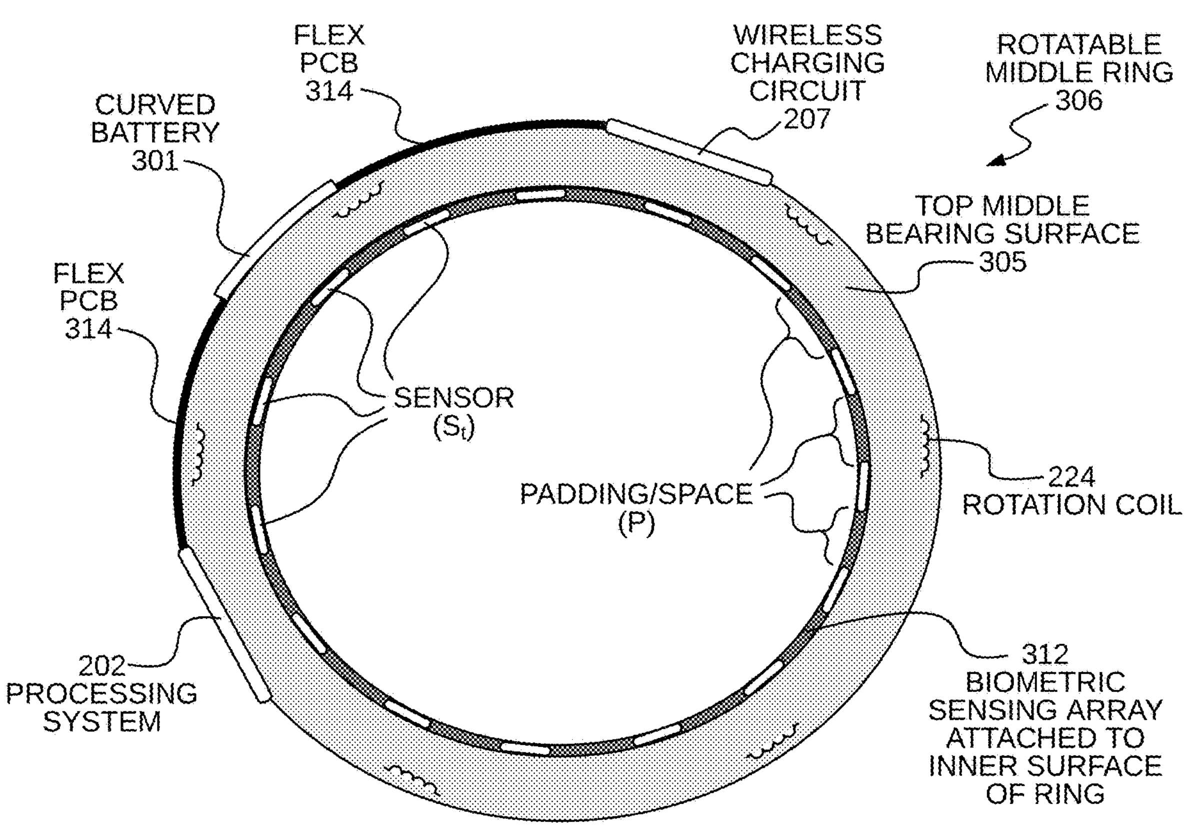
FIG. 4 shows a top view of a rotatable middle ring for use with the PID shown in FIG. 3.

FIG. 4 shows a top view of a rotatable middle ring for use with the PID shown in FIG. 3.

Figure 5:
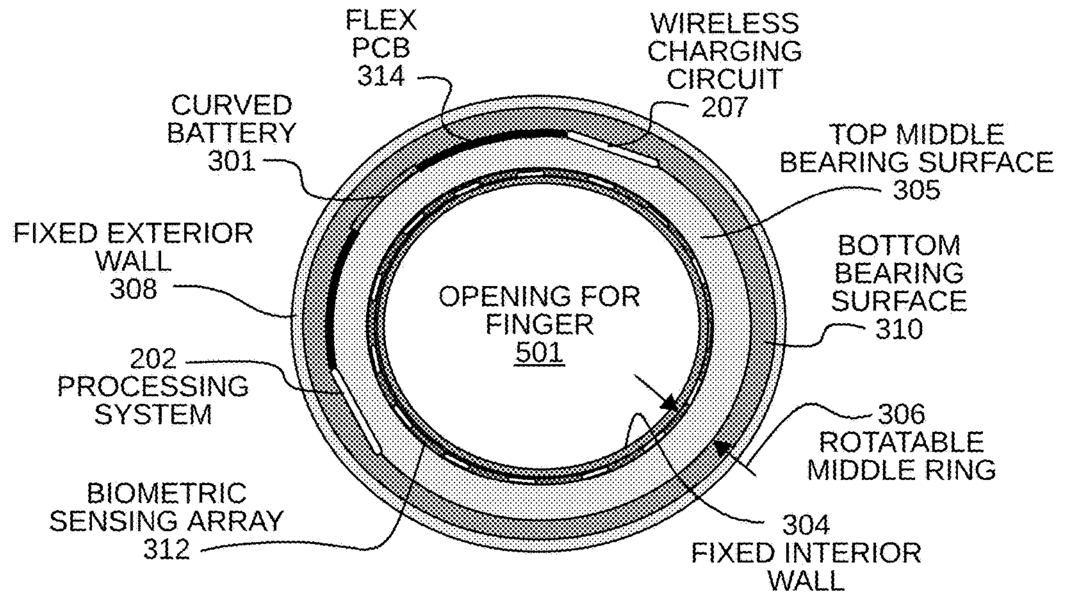
FIG. 5 shows a top view of an entire ring assembly that forms the PID shown in FIG. 3.

FIG. 5 shows a top view of an entire ring assembly that forms the PID shown in FIG. 3.

Figure 6:
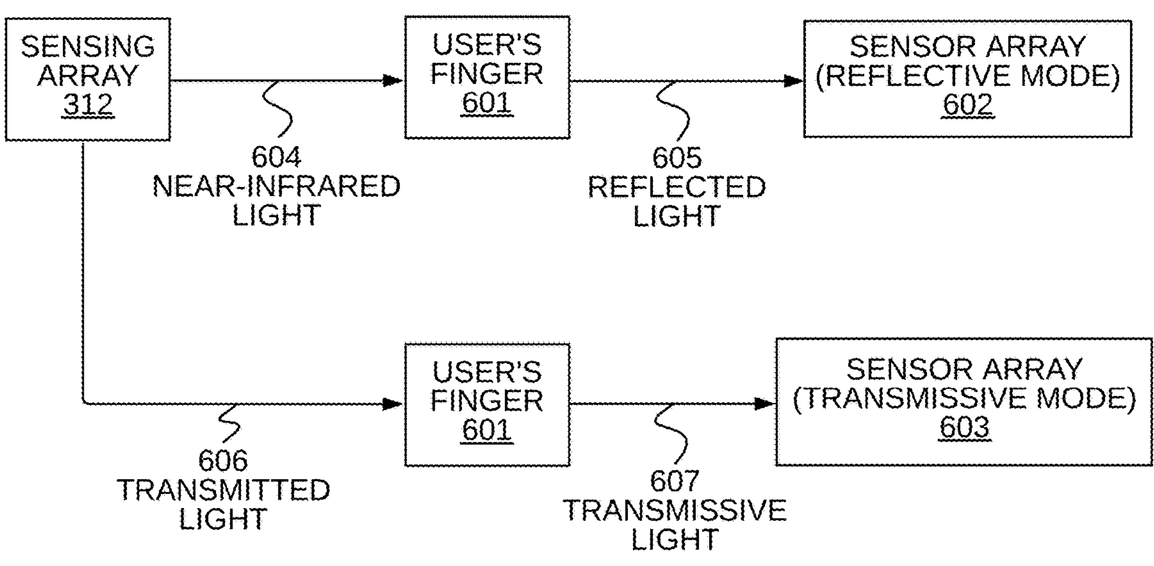
FIG. 6 shows a diagram illustrating sensor array modes.

FIG. 6 shows a diagram illustrating sensor array modes. In an reflective mode of operation, the sensor array 312 outputs near-infrared light that strikes the user's finger 601 and reflects to form reflected light 605 that is detected during the reflective mode. In a transmissive mode, the sensor array 312 outputs transmitted light that passes through the user's finger 601 to form transmissive light 607 that is detected during the transmissive mode.

Figure 7:
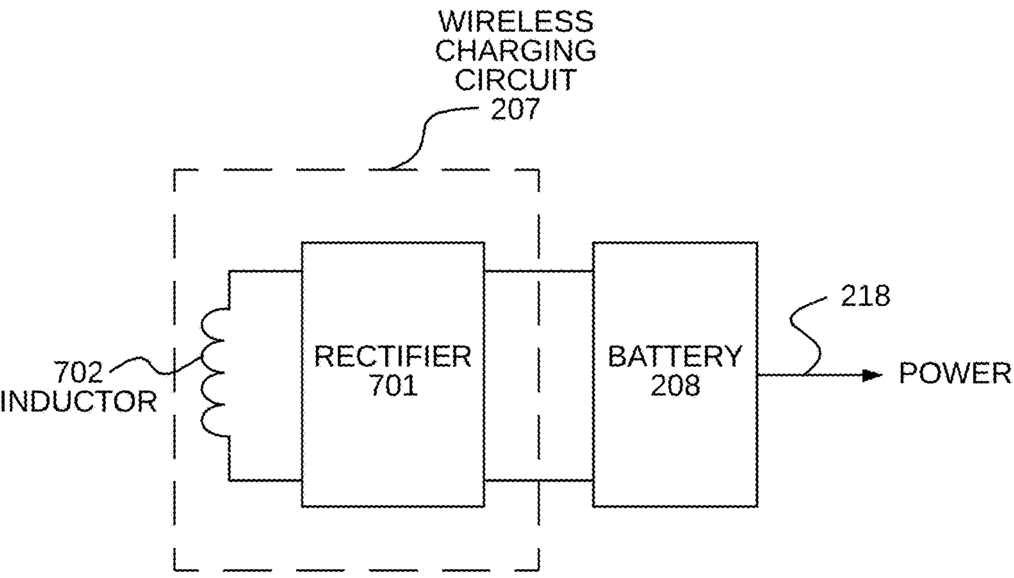
FIG. 7 shows a wireless charging circuit.

FIG. 7 shows a wireless charging circuit 207. In one embodiment, the wireless charging circuit 207 includes a rectifier 701 and an inductor 702 that receives power transmitted wirelessly. The received power is used to charge the battery 208, which in turn provides battery power 218 to the PID.

Figure 8:
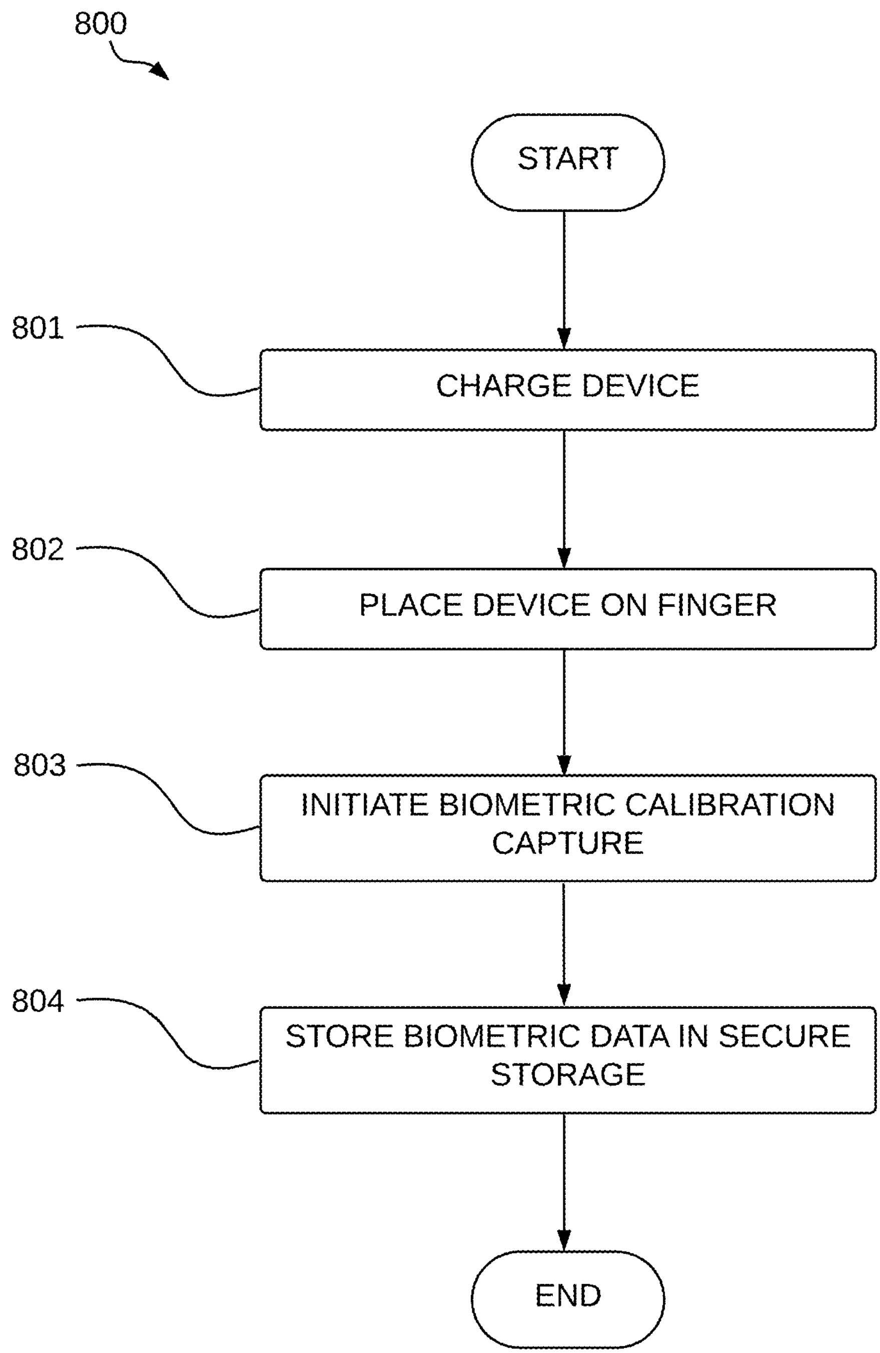
FIG. 8 shows a diagram of a method for biometric calibration of a PID.

FIG. 8 shows a diagram of a method 800 for biometric calibration of a PID.

At step 801, a device is charged.

At step 802, the device is placed on a user's finger.

At step 803, biometric calibration capture is initiated.

At step 804, biometric data is stored in a secure storage.

Figure 9:
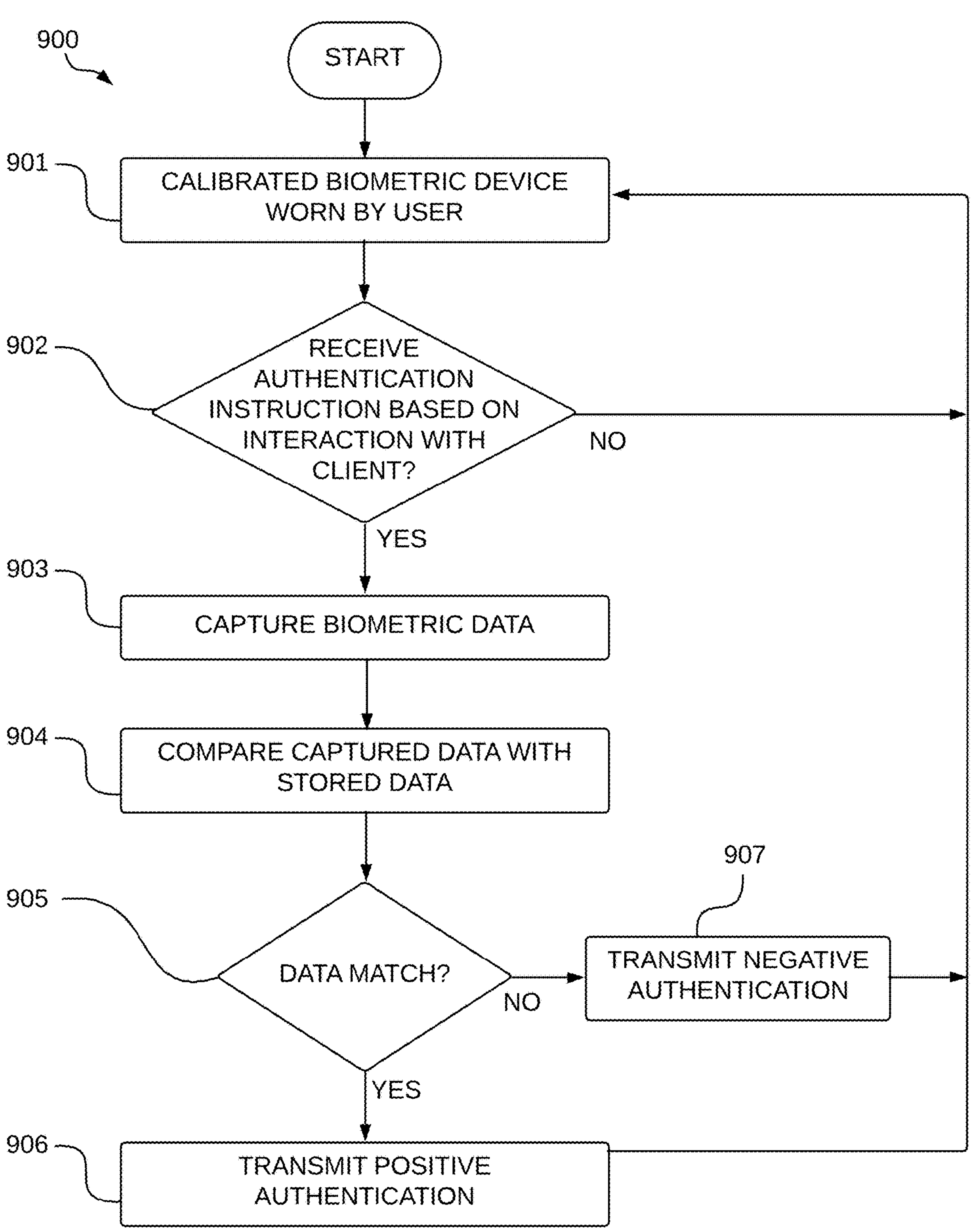
FIG. 9 shows a diagram of a method for user authentication using a PID.

FIG. 9 shows a diagram of a method 900 for user authentication using a PID.

At step 901, a calibrated biometric device is worn by a user.

At step 902, a determination is made as to whether authentication instruction based on interaction with client is received. If no authentication instruction is received, the method returns to step 901. If authentication instruction is received, the method proceeds to step 903.

At step 903, biometric data is captured.

At step 904, the captured data is compared with stored data.

At step 905, a determination is made as to whether the captured data matches the stored data. If not, the method proceeds to step 907. If so, the method proceeds to step 906.

At step 907, negative authentication is transmitted. Then, the method returns to step 901.

At step 906, positive authentication is transmitted. Then, the method returns to step 901.

Figure 10:
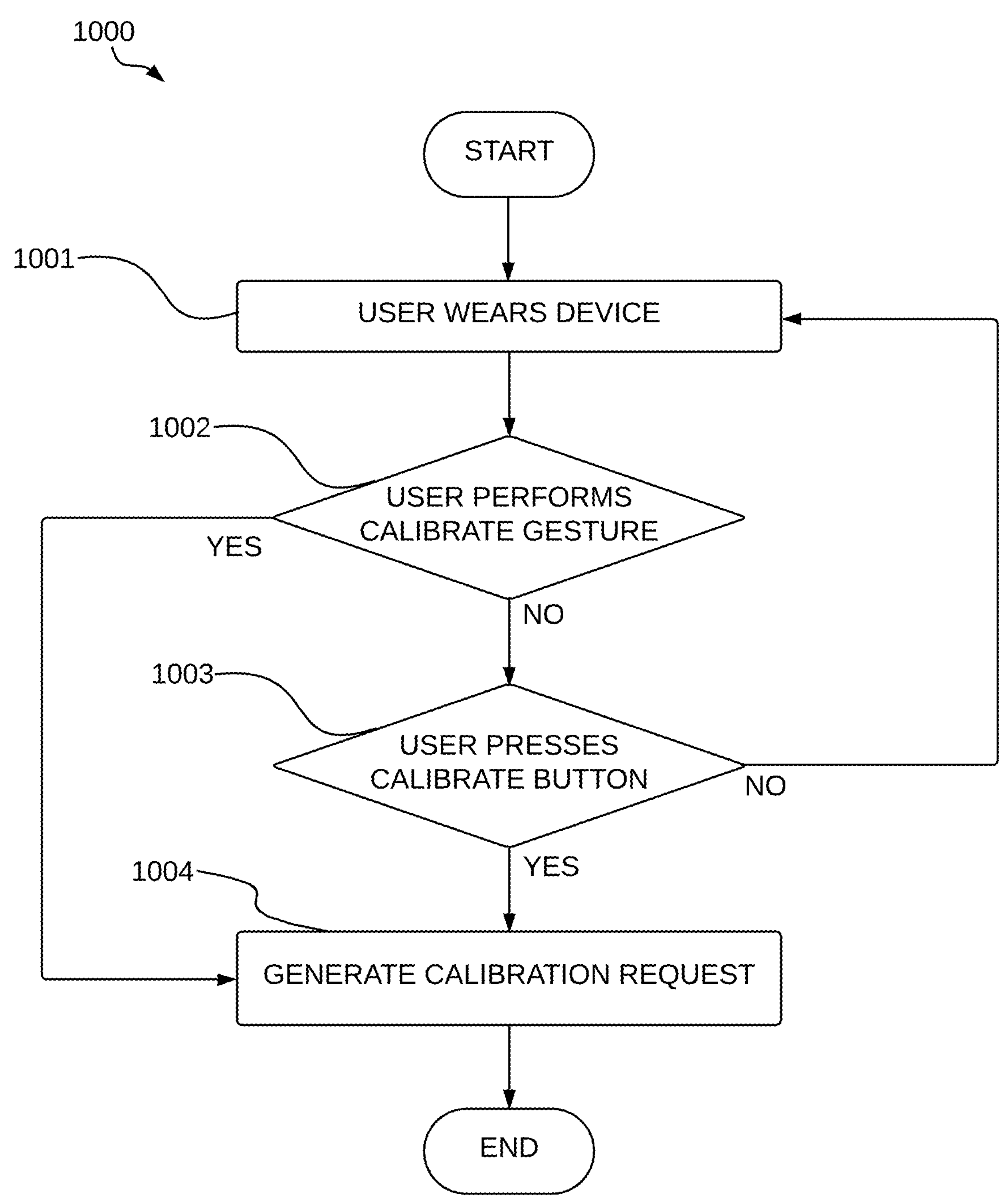
FIG. 10 shows a diagram for a method for initiating calibration of a PID.

FIG. 10 shows a diagram for a method 1000 for initiating calibration of a PID.

At step 1001, a device is worn by a user.

At step 1002, a determination is made as to whether a calibrate gesture is performed by the user. If the user performs a calibrate gesture, then the method proceeds to step 1004. If the user does not perform a calibrate gesture, the method proceeds to step 1003.

At step 1003, a determination is made as to whether a calibrate button is pressed by the user. If the user presses the calibrate button, then the method proceeds to step 1004. If the user does not press the calibrate button, the method returns to step 1001.

At step 1004, a calibration request is generated.

Figure 11:
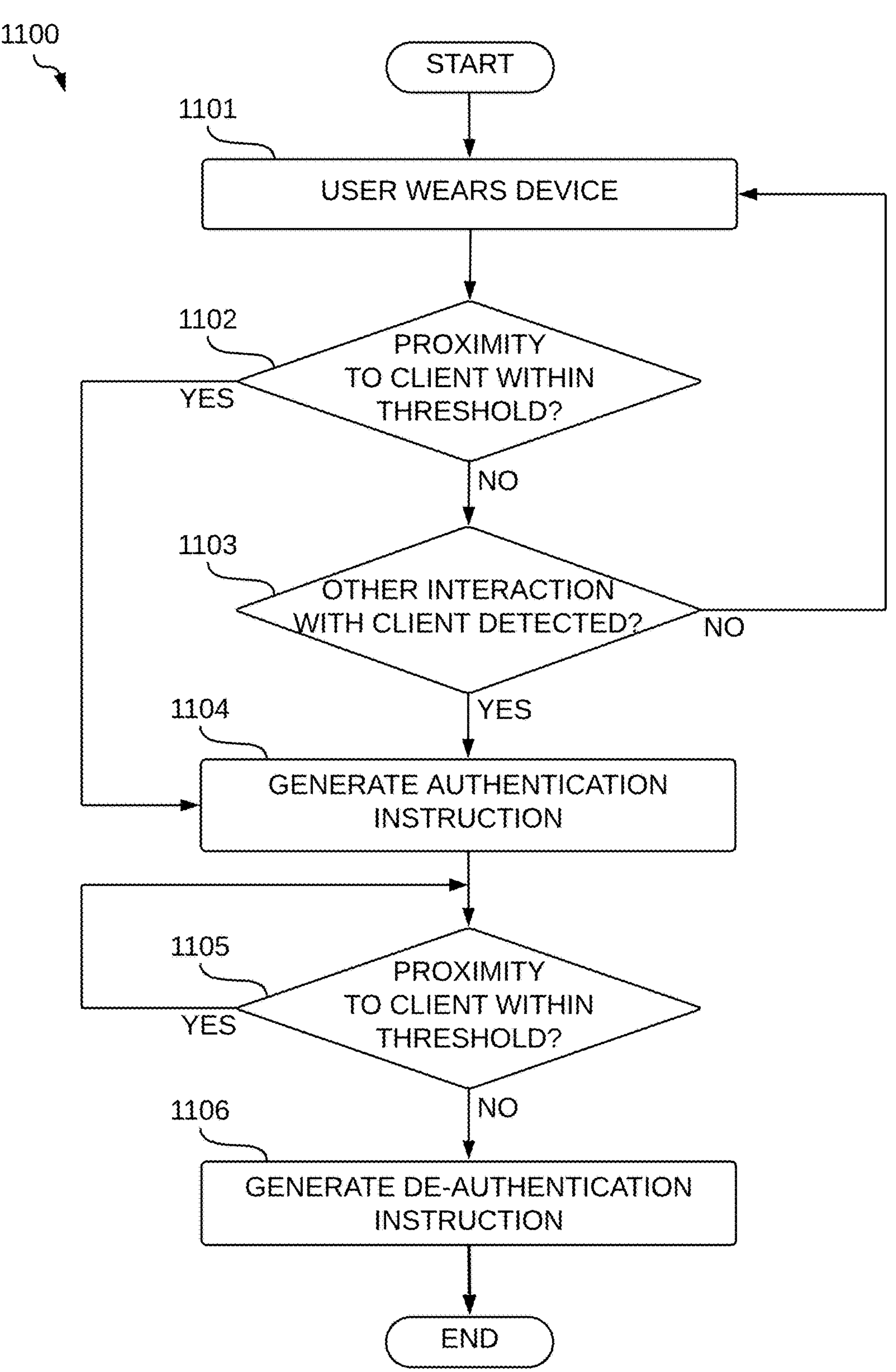
FIG. 11 shows a method for initiating and maintaining user authentication.

FIG. 11 shows a diagram of a method 1100 for initiating and maintaining user authentication.

At step 1101, a device is worn by a user.

At step 1102, a determination is made as to whether the device is within a proximity to a client. The proximity is set to a pre-determined threshold distance. If the device is within the threshold proximity to the client, the method proceeds to step 1104. If not, the method proceeds to step 1103.

At step 1103, a determination is made as to whether another interaction with the client is detected. If yes, the method proceeds to step 1104. If not, the method returns to step 1101.

At step 1104, an authentication instruction is generated.

At step 1105, a determination is made as to whether the device is within a proximity to a client. If the device is within the threshold proximity to the client, the method returns to step 1105. If not, the method proceeds to step 1106.

At step 1106, a de-authentication instruction is generated.

Figure 12:
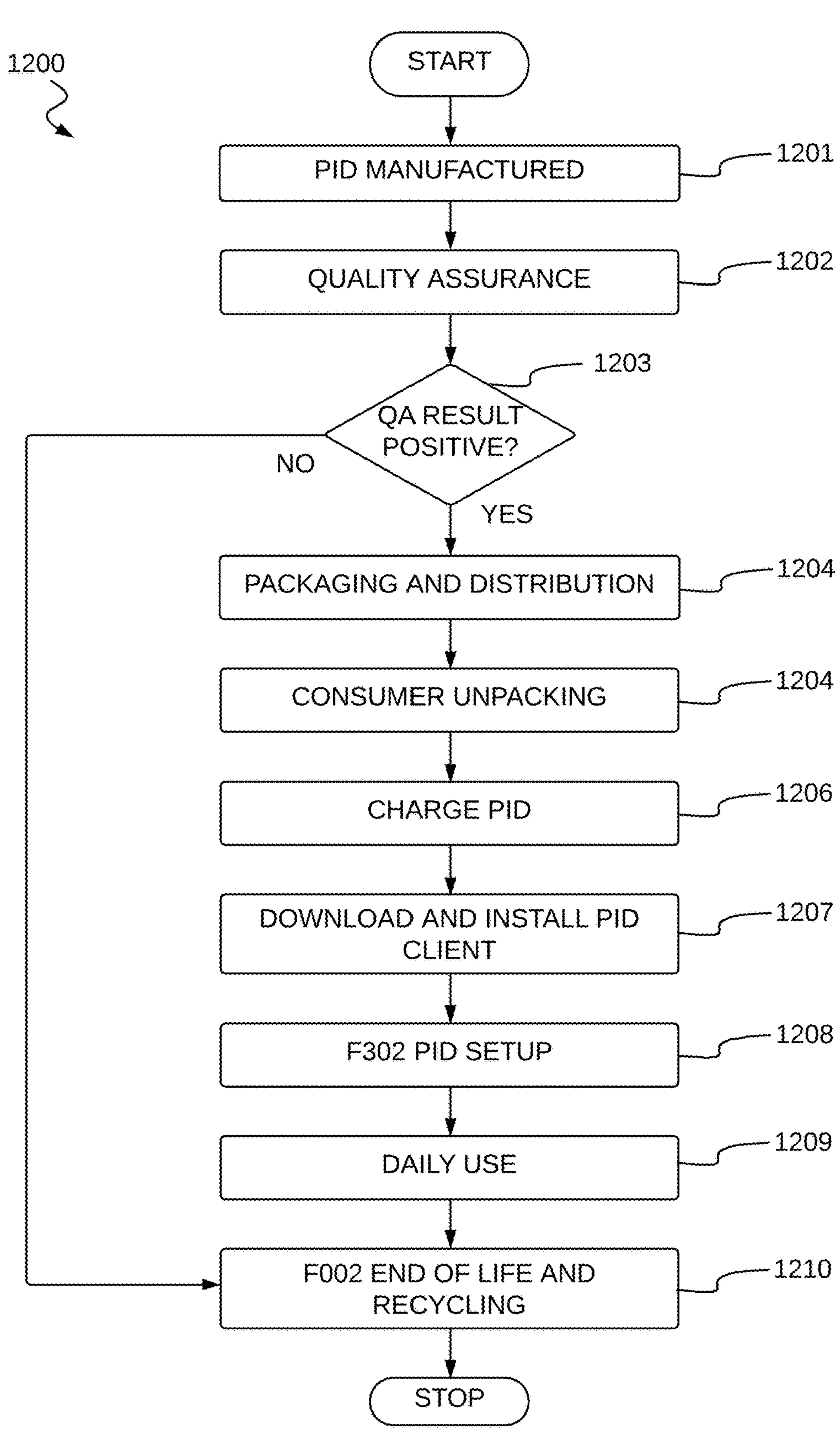
FIG. 12 shows a diagram illustrating a PID life cycle.

FIG. 12 shows a diagram illustrating a PID life cycle.

At step 1201, a PID is manufactured in accordance with the hardware and software disclosed herein.

At step 1202, the manufactured PID is tested for quality control prior to sale.

At step 1203, a determination is made as to whether the PID passes the quality control checks. If the PID passes the quality control checks, the method proceeds to step 1204. If the PID does not pass the quality control checks, the method proceeds to step 1210.

At step 1204, the PID is packaged and distributed for sale to the public.

At step 1205, a user purchases the PID and unpacks the PID for use.

At step 1206, the PID is charged for use.

At step 1207, a PID client is downloaded and installed on the PID.

At step 1208, a PID setup procedure is performed.

At step 1209, the PID is put into daily use.

At step 1210, the PID goes through an end of life and recycling process.

Figure 13:
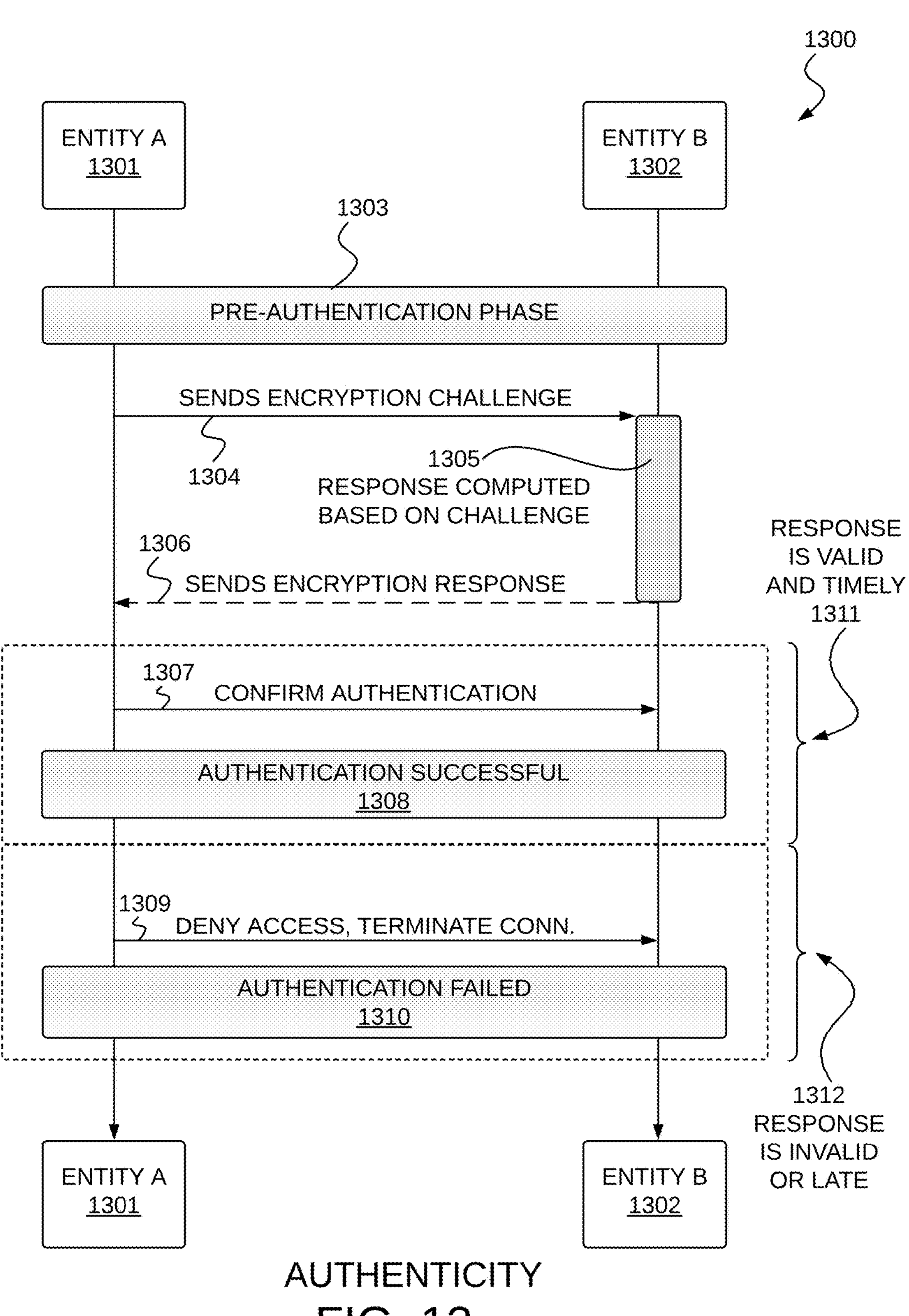
FIG. 13 shows a diagram illustrating message transactions to perform authentication.

FIG. 13 shows a diagram illustrating message transactions 1300 used to perform authentication between entity A 1301 and entity B 1302. In a pre-authentication phase 1302, entity A 1301 transmits an encryption challenge 1304 to entity B 1302. Entity B 1302 then computes a response that is based on the received challenge during interval 1306. Entity B 1302 transmits an encrypted response 1306 to entity A 1301. One of two results are determined from the response 1306.

In a first result shown at 1311, entity A 1301 sends an authenticity confirmation message 1307 to entity B 1302 that confirms that the authentication process was successful 1308.

In a second result shown at 1312, entity A 1301 sends a deny access and terminate connection message 1309 to entity B 1302 that confirms that the authentication process failed 1310.

Figure 14:
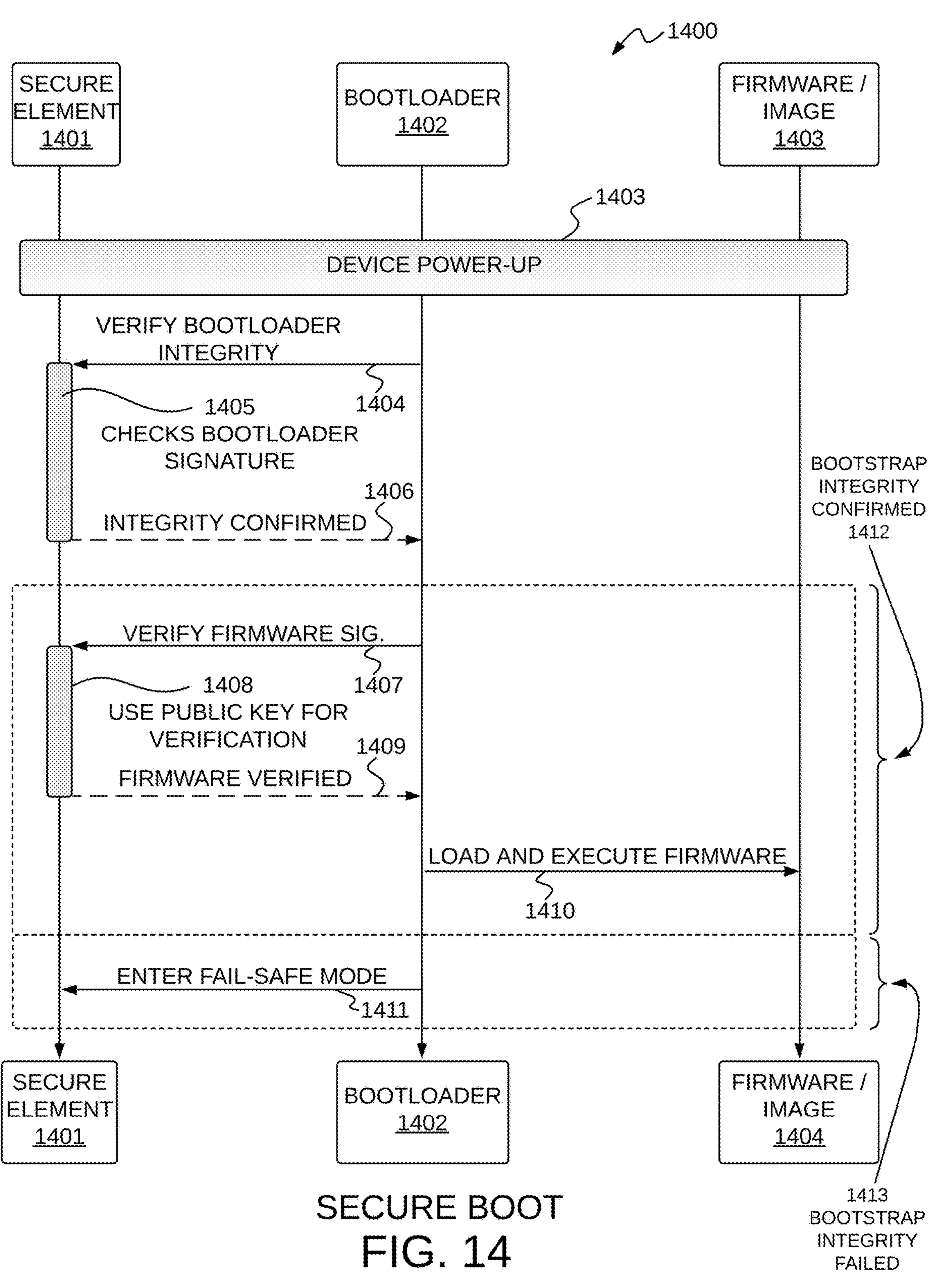
FIG. 14 shows a diagram illustrating message transactions used to perform a secure boot operation.

FIG. 14 shows a diagram illustrating message transactions 1400 used to perform a secure boot operation. A secure element 1401, bootloader 1402, and firmware image 1403 are involved in this process.

In a device power-up phase 1403, bootloader 1402 transmits an integrity verification message 1404 to secure element 1401. Secure element 1401 then checks the bootloader signature during interval 1405. If the signature is confirmed, secure element 1401 transmits an integrity confirmed response 1406 to bootloader 1402. One of two results are determined from the response 1406.

In a first result shown at 1412, the integrity confirmed response 1406 is positive so the bootloader 1402 then transmits a firmware signature verification message 1407 to the secure element 1401. Secure element 1401 then checks the firmware signature during interval 1408. If the signature is confirmed, secure element 1401 transmits a firmware verified response 1409 to bootloader 1402. Next, the bootloader 1402 loads and executes firmware 1410 to generate the firmware image 1403.

In a second result shown at 1413, the integrity confirmed response 1406 is negative so the bootloader 1402 then transmits a command to enter a fail-safe mode 1411 to the secure element 1401.

Figure 15:
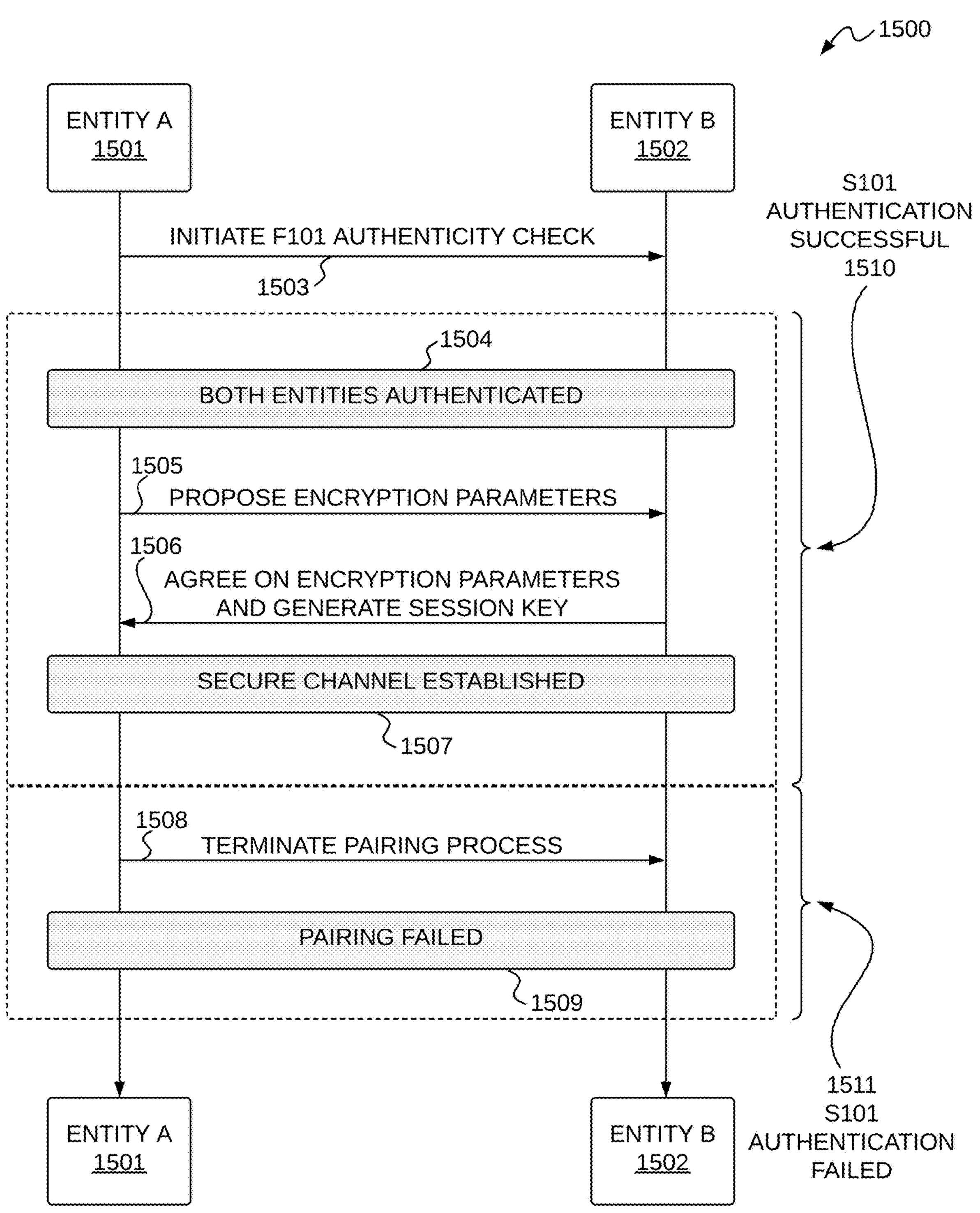
FIG. 15 shows a diagram illustrating message transactions used to perform a secure pairing operation between two entities.

FIG. 15 shows a diagram illustrating message transactions 1500 used to perform a secure pairing operation between entity A 1501 and entity B 1502.

To begin this operation, Entity A 1501 transmits an Initiate F101 authenticity check message 1503 to Entity B. One of two results are determined from the message 1503.

A first result in which the authentication was successful is shown at 1510. In this result, both entities are authenticated 1504. Next, Entity A 1501 transmits proposed encryption parameters 1505 to Entity B 1502. Entity B 1502 response with an agreement of the encryption parameters and a session key message 1506. As a result of these transactions, a secure channel 1507 is established between Entity a 1501 and Entity B 1502.

A second result in which the authentication failed is shown at 1511. In this result, Entity A 1501 transmits a termination message 1508 to terminate the pairing process. As a result, the pairing between Entity A 1501 and Entity B 1502 has failed.

Figure 16:
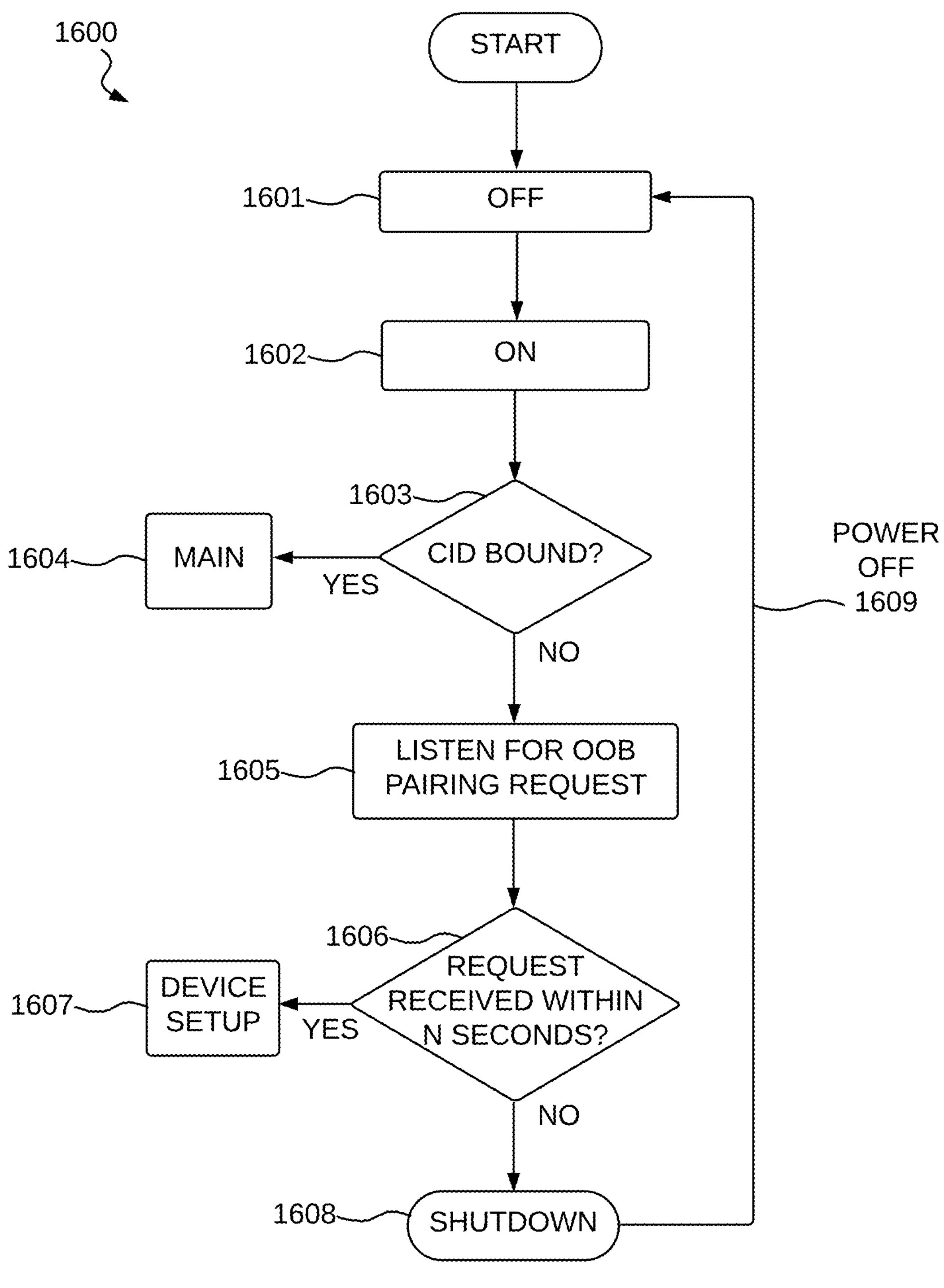
FIG. 16 shows a diagram of a flow graph for setting a Client Interface Device (CID) state.

FIG. 16 shows a diagram of a flow graph for setting a CID (Client Interface Device) state.

At step 1601, the PID is in an off state.

At step 1602, the PID is in an on state.

At step 1603, A determination is made as to whether the PID is CID bound. If the PID is CID bound, the method proceeds to step 1604. If the PID is not CID bound, the method proceeds to step 1605.

At step 1604, the PID performs a main function.

At step 1605, the PID listens for an OOB pairing request.

At step 1606, a determination is made whether the OOB pairing request is received within a selected number (N) of seconds. If the pairing request is received within the selected time interval, the method proceeds to step 1607. If the pairing request is not received within the selected time interval, the method proceeds to block 1608.

At step 1607, a PID setup function is performed.

At step 1608, The PID is shut down. The method proceeds to step 1601 utilizing path 1609.

Figure 17:
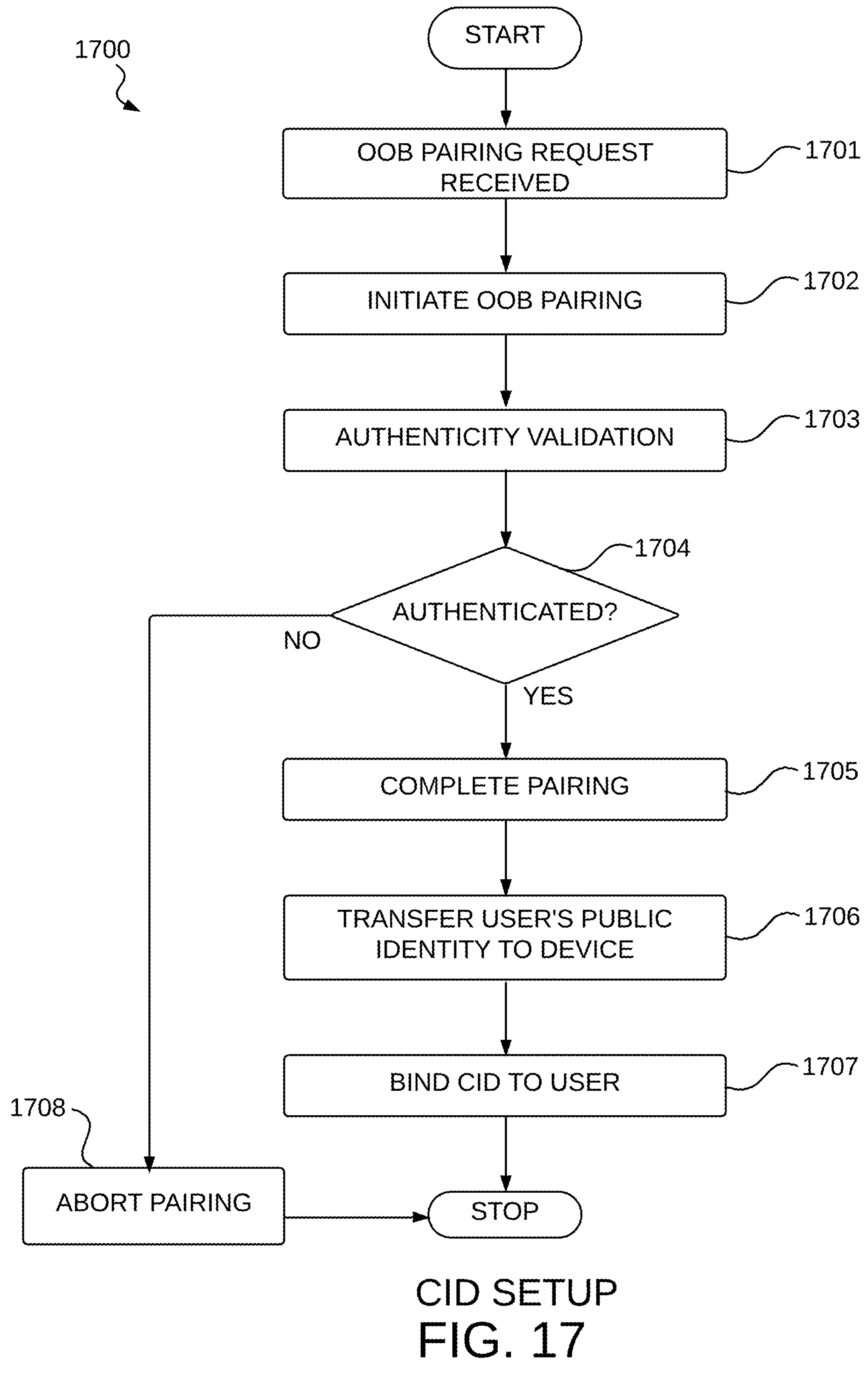
FIG. 17 shows a diagram of a flow graph for setting up a CID.

FIG. 17 shows a diagram of a flow graph for setting up a CID.

At step 1701, an OOB pairing request is received.

At step 1702, OOB pairing is initiated.

At step 1703, authenticity validation is performed.

At step 1704, A determination is made as to whether authenticity has been authenticated. If authenticated, the method proceeds to step 1705. If not authenticated, the method proceeds to step 1708.

At step 1705, pairing is completed.

At step 1706, the user's public identity is transferred to the device.

At step 1707, CID is bound to the user.

At step 1708, pairing is aborted.

Figure 18:
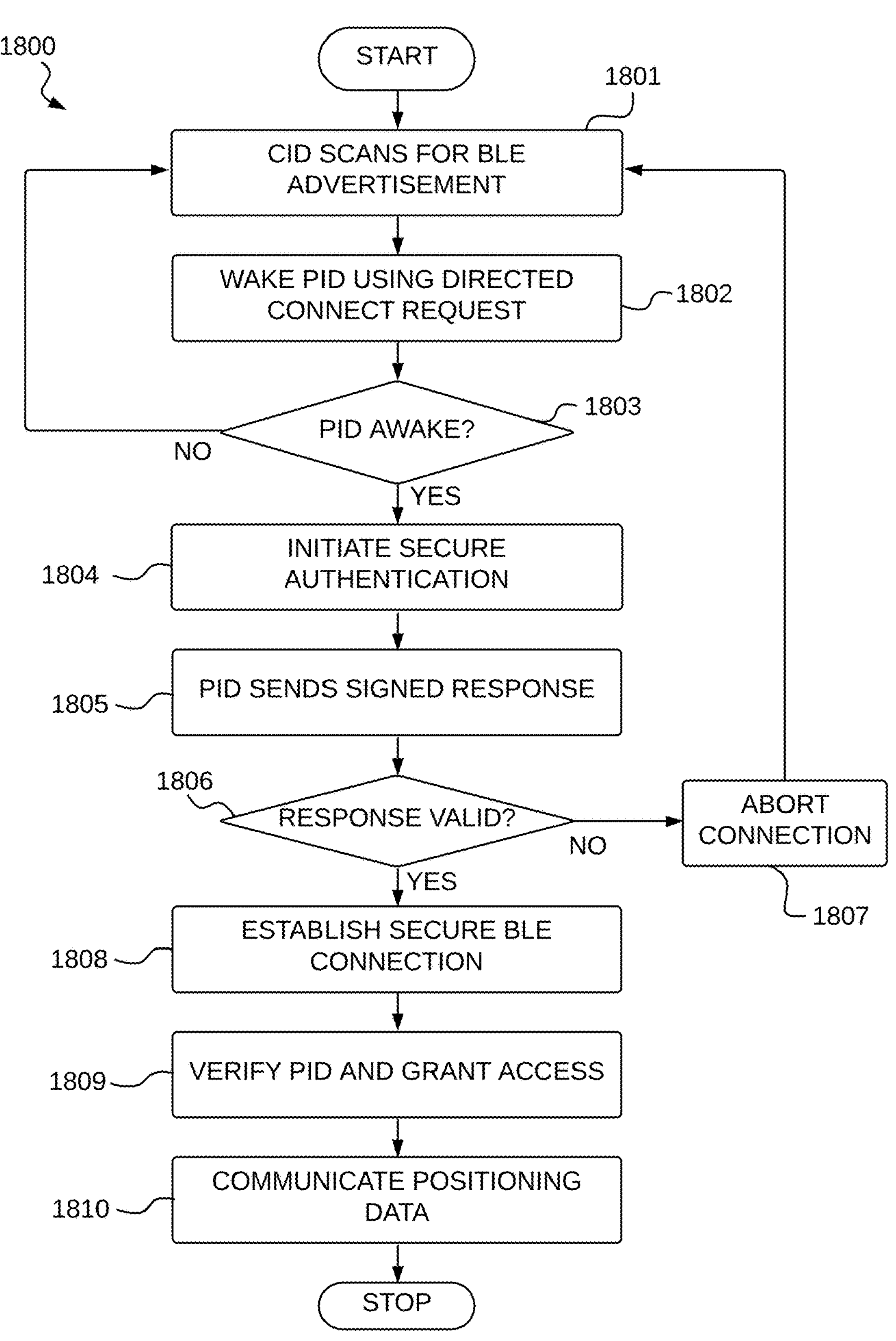
FIG. 18 shows a diagram of a flow graph for PID detection.

FIG. 18 shows a diagram of a flow graph for PID detection.

At step 1801, the CID scans for a BLE advertisement.

At step 1802, the PID is awakened using a direct connect request.

At step 1803, a determination is made as to whether the PID is awake. If the PID is not awake the method proceeds to step 1801. If the PID is awake the method precedes to step 1804.

At step 1804, secure authentication is initiated.

At step 1805, the PID sends a signed response.

At step 1806, a determination is made as to whether the response is valid. If the response is not valid the method proceeds to step 1807. If the response is valid the method proceeds to step 1808.

At step 1807, the connection is aborted and the method proceeds to step 1801.

At step 1808, a secure BLE connection is established.

At step 1809, the PID is verified and access is granted.

At step 1810, positioning data is communicated.

Figure 19:
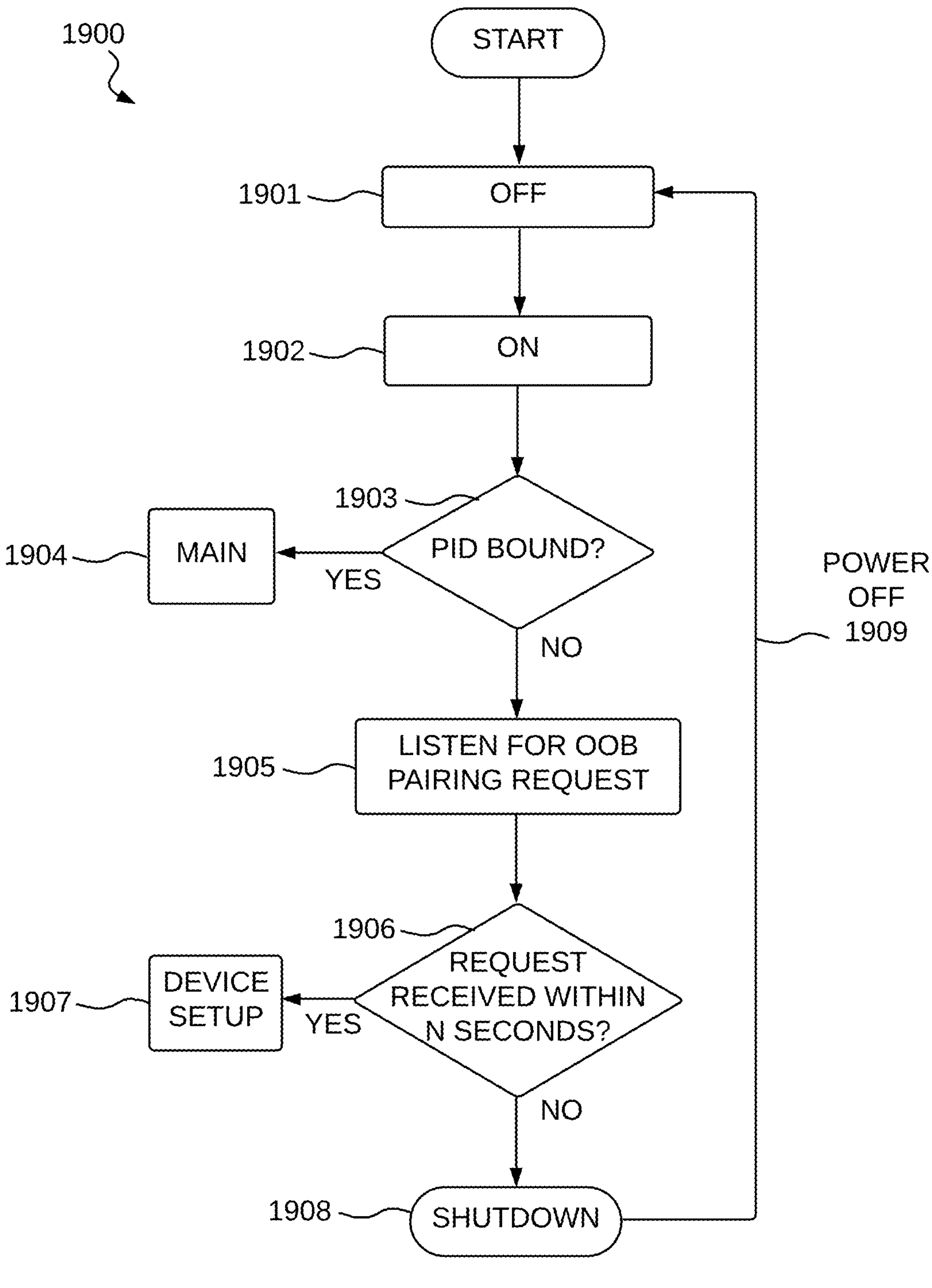
FIG. 19 shows a diagram of a flow graph for setting a PID state.

FIG. 19 shows a diagram of a flow graph for setting a PID state.

At step 1901, the PID is in an off state.

At step 1902, the PID is in an on state.

At step 1903, a determination is made as to whether the PID is PID bound. If the PID is PID bound, the method proceeds to step 1904. If the PID is not PID bound, the method proceeds to step 1905.

At step 1904, the PID performs a main function.

At step 1905, the PID listens for an OOB pairing request.

At step 1906, a determination is made whether the OOB pairing request is received within a selected number (N) of seconds. If the pairing request is received within the selected time interval, the method proceeds to step 1607. If the pairing request is not received within the selected time interval, the method proceeds to block 1908.

At step 1907, a PID setup function is performed.

At step 1908, The PID is shut down. The method proceeds to step 1901 utilizing path 1909.

Figure 20:
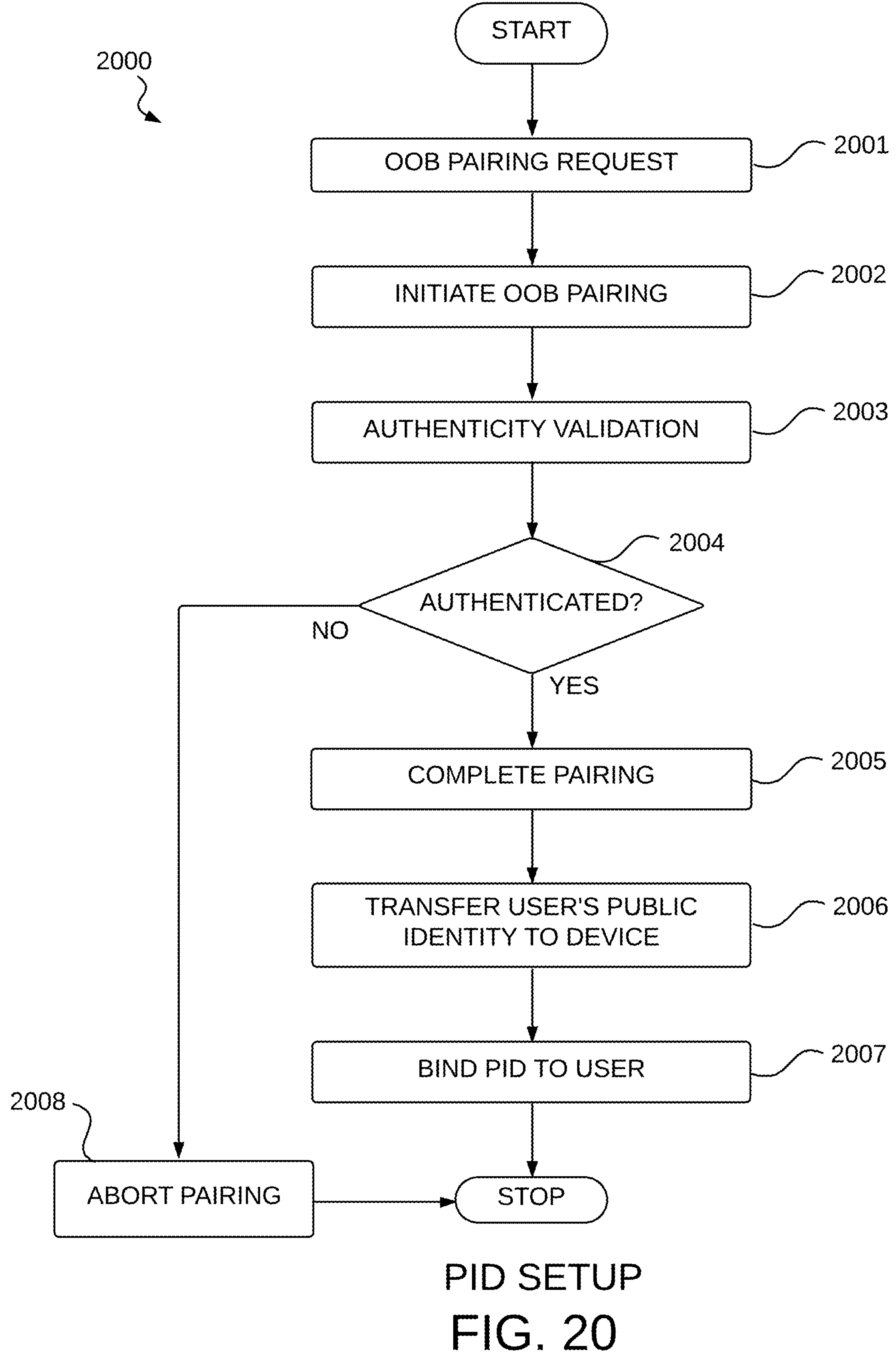
FIG. 20 shows a diagram of a flow graph for PID setup.

FIG. 20 shows a diagram of a flow graph for setting up a PID.

At step 2001, an OOB pairing request is received.

At step 2002, OOB pairing is initiated.

At step 2003, authenticity validation is performed.

At step 2004, A determination is made as to whether authenticity has been authenticated. If authenticated, the method proceeds to step 2005. If not authenticated, the method proceeds to step 2008.

At step 2005, pairing is completed.

At step 2006, the user's public identity is transferred to the device.

At step 2007, CID is bound to the user.

At step 2008, pairing is aborted.

Figure 21:
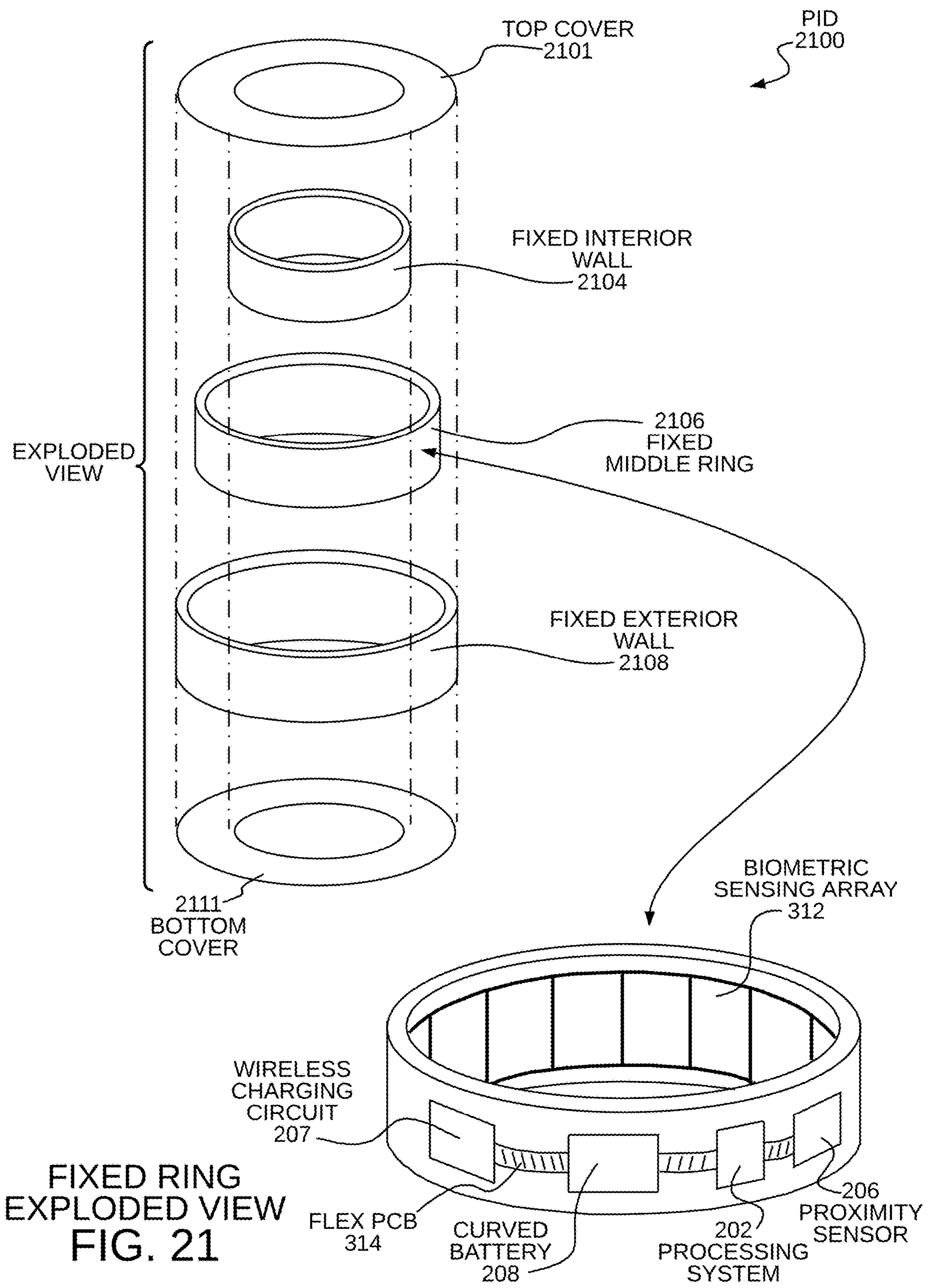
FIG. 21 shows an exploded view of an alternative embodiment of a PID.

FIG. 21 shows an exploded view of an alternative embodiment of a PID 2100. In this embodiment, a fixed middle ring 2106 is provided that does not rotate. A sequence of vein images of the user's finger are captured by activating the appropriate LEDS and biometric sensors such that the captured images can be combined to generate an accurate vein pattern.

Figure 22:
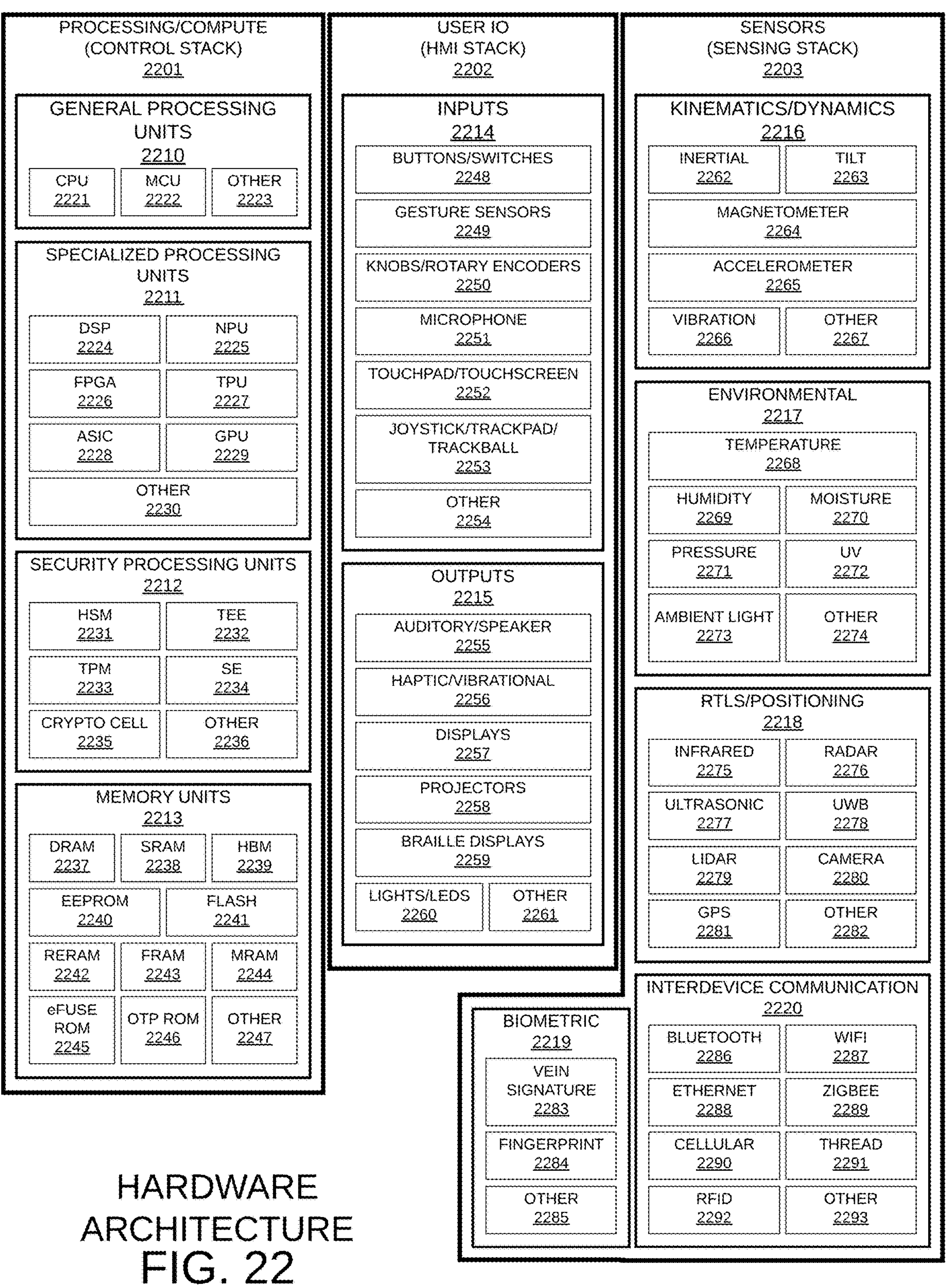
FIG. 22 shows a hardware architecture block diagram of a biometric authentication system.

FIG. 22 shows a hardware architecture block diagram of a biometric authentication system. A biometric authentication system comprises a control stack 2201, a human-machine interface stack 2202, and a sensing stack 2203. In some embodiments, the biometric authentication system does not include an HMI stack.

A control stack 2201 for processing and compute comprises one or more memory units 2213 and at least one of: one or more general processing units 2210, one or more specialized processing units 2211, or one or more security processing units 2212. General processing units 2210 may include a CPU 2221, an MCU 2222, or any other general processing unit 2223. Specialized processing units 2211 may include a DSP 2224, an NPU 2225, an FPGA 2226, a TPU 2227, an ASIC 2228, a GPU 2229, or any other specialized processing unit 2230. Security processing units 2212 may include a hardware security module (HSM) 2231, a trusted execution environment (TEE) 2232, a trusted platform module (TPM) 2233, a secure environment (SE) 2234, a crypto cell 2235, or any other security processing unit 2236. Memory units 2213 may include volatile memory, non-volatile memory, or single-write memory. Volatile memory may include dynamic RAM (DRAM) 2237, static RAM (SRAM) 2238, or high bandwidth memory (HBM) 2239. Non-volatile memory may include an EEPROM 2240, flash memory 2241, RERAM 2242, FRAM 2243, or MRAM 2244. Single-write memory may include eFuse ROM 2245 or OTP ROM 2246. Memory units 2213 contain machine readable instructions that are executed by processing units 2210, 2211, or 2212 to perform the functions of a biometric authentication system.

A human-machine interface (HMI) stack 2202 for user IO comprises one or more inputs 2214 and one or more outputs 2215. Inputs 2214 may include buttons/switches 2248, gesture sensors 2249, knobs/rotary encoders 2250, a microphone 2251, a touchscreen 2252, a joystick/trackpad/trackball 2253, or other input devices 2254. Outputs 2215 may include auditory output/speakers 2255, haptic feedback/vibrational output 2256, displays 2257, projectors 2258, braille displays 2259, lights/LEDs 2260, or other output devices 2261. In some embodiments, the HMI stack does not include either inputs 2214 or outputs 2215.

A sensing stack 2203 comprises one or more sensors, such as kinematics/dynamics sensors 2216, environmental sensors 2217, Real-Time Locating System (RTLS) or positioning sensors 2218, biometric sensors 2219, or interdevice communications 2220. Kinematics or dynamics sensors 2216 may include an inertial sensor 2262, a tilt sensor 2263, a magnetometer 2264, an accelerometer 2265, a vibration sensor 2266, or any other kinematics or dynamics sensor 2267. Environmental sensors 2217 may include a temperature sensor 2268, a humidity sensor 2269, a moisture sensor 2270, a pressure sensor 2271, an ultraviolet sensor 2272, an ambient light sensor 2273, or any other environmental sensor 2274. RTLS or positioning sensors 2218 may include an infrared sensor 2275, RADAR 2276, an ultrasonic sensor 2277, an ultra-wideband sensor 2278, LIDAR 2279, a camera 2280, a GPS sensor 2281, or any other positioning sensor 2282. Biometric sensors 2219 may include a vein signature sensor 2283, a fingerprint sensor 2284, or any other biometric sensor 2285. Interdevice communications 2220 may include a Bluetooth module 2286, a wifi module 2287, an Ethernet module 2288, a Zigbee module 2289, a cellular module 2290, a thread module 2291, an RFID module 2292, or any other interdevice communication module 2293.

In some embodiments of a biometric authentication system, a PID comprises at least one biometric sensor 2219 and at least one interdevice communications module 2220, while a CID comprises at least one RTLS or positioning sensor 2218 and at least one interdevice communication module 2220. In other embodiments of a biometric authentication system, a PID comprises at least one RTLS or positioning sensor 2218, at least one biometric sensor 2219, and at least one interdevice communication module 2220, while a CID comprises at least one interdevice communication module 2220. In yet other embodiments of a biometric authentication system, a PID comprises at least one RTLS or positioning sensor 2218, at least one biometric sensor 2219, and at least one interdevice communication module 2220, while a CID comprises at least one RTLS or positioning sensor and at least one interdevice communication module 2220.

Figure 23:
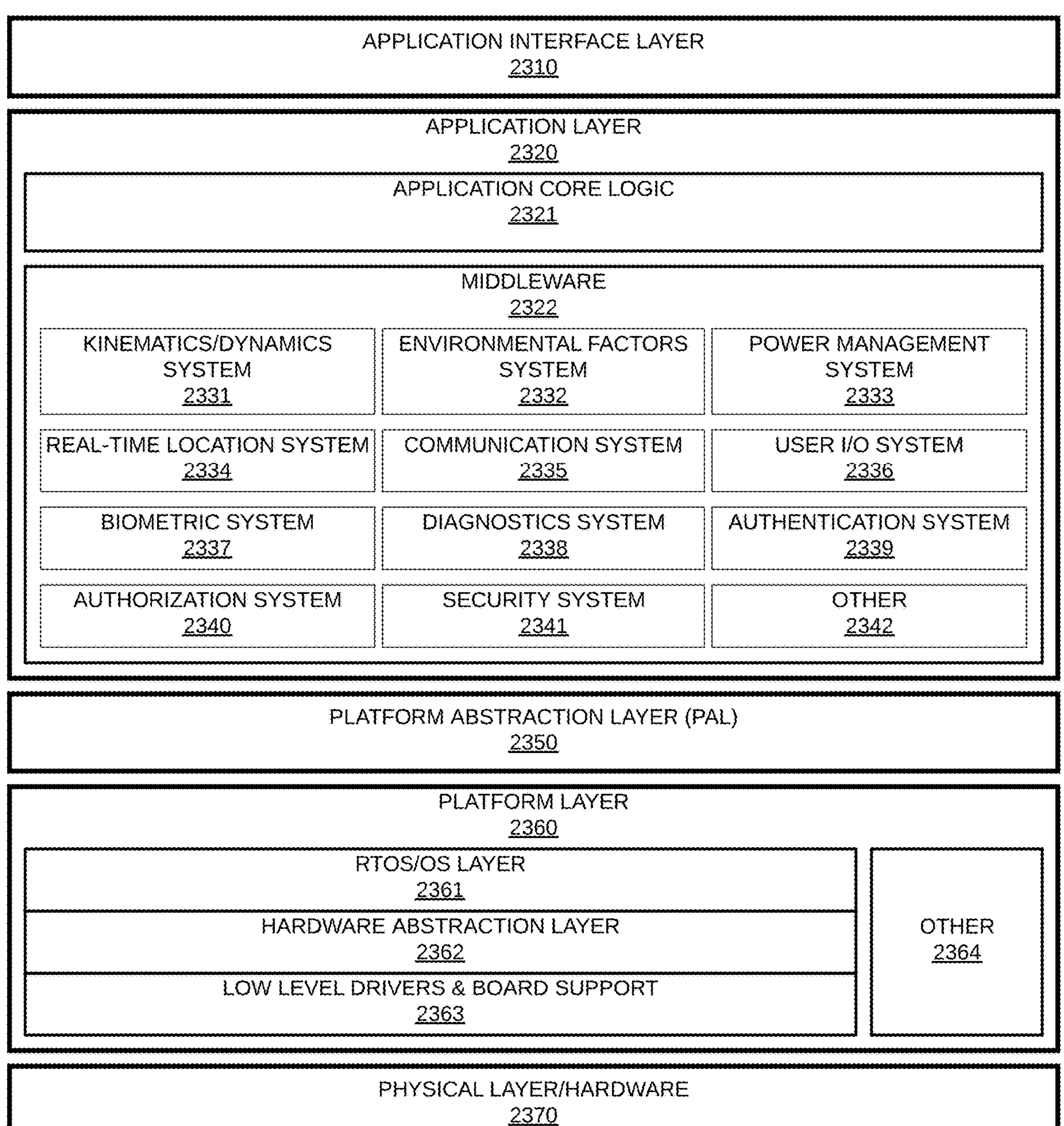
FIG. 23 shows a software architecture block diagram of a biometric authentication system.

FIG. 23 shows a software architecture block diagram of a biometric authentication system. A biometric authentication system includes an application interface layer 2310, an application layer 2320, a platform abstraction layer 2350, a platform layer 2360, and a physical layer/hardware 2370.

The application interface layer 2310 interfaces with the application layer 2320. The application layer 2320 comprises application core logic 2321 and middleware 2322. Application core logic 2321 may be either CID or PID core logic. Middleware 2322 includes multiple subsystems. These subsystems may include a kinematics/dynamics system 2331, an environmental factors system 2332, a power management system 2333, a real-time location system (RTLS) 2334, a communication system 2335, a user IO system 2336, a biometric system 2337, a diagnostics system 2338, an authentication system 2339, an authorization system 2340, a security system 2341, and any other subsystems 2342.

The application layer 2320 interfaces with the platform abstraction layer (PAL) 2350. The platform abstraction layer 2350 simplifies the interactions between the application layer 2320 and the underlying hardware by providing a uniform interface, regardless of the specific operating system or hardware on which the software is running. The platform layer 2360 includes an RTOS/OS layer 2361, a hardware abstraction layer 2362, low-level drivers and board support 2363, and any other platform specific features 2364. The platform layer 2360 provides a mechanism for the platform abstraction layer 2350 to interface with the physical layer or hardware 2670.

Figure 24:
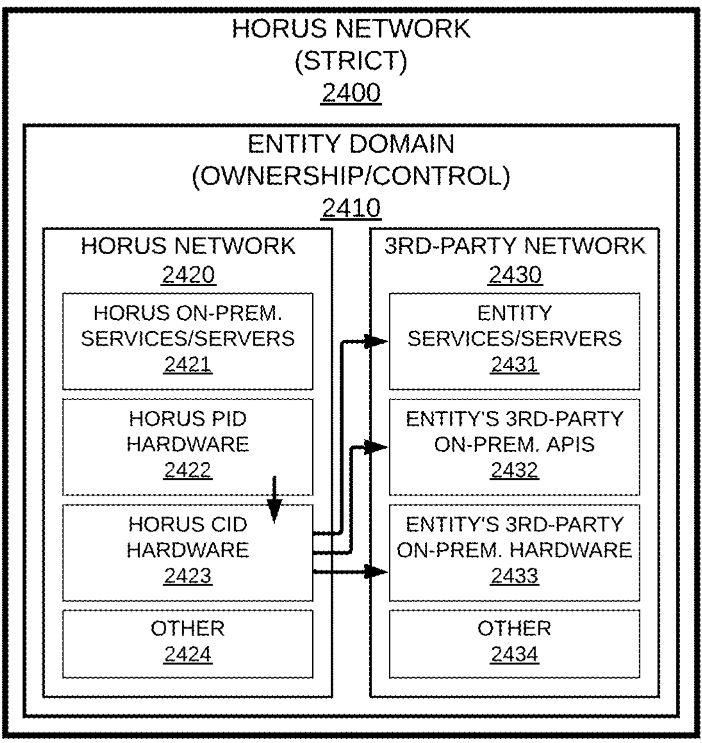
FIG. 24 shows a network architecture block diagram of a strict network embodiment of a biometric authentication system.

FIG. 24 shows a network architecture block diagram of a strict network embodiment of a biometric authentication system operated by an entity. In a strict network embodiment of a biometric authentication system, a PID 2422 within a HORUS network 2420 communicates exclusively with one or more CIDs 2423 operated by the entity within the same HORUS network 2420. The HORUS network 2420 additionally comprises HORUS on-premise services and servers 2421 and other HORUS network devices 2424. A CID 2423 within the HORUS network 2420 will communicate with the entity's services and servers 2431, an entity's 3rd-party on-premise APIs 2432, and an entity's 3rd-party on-premise hardware 2433 within the 3rd-party network 2430. Both the HORUS network 2420 and the 3rd-party network 2430 are within the entity domain 2410 and are owned and controlled by the entity.

Figure 25A:
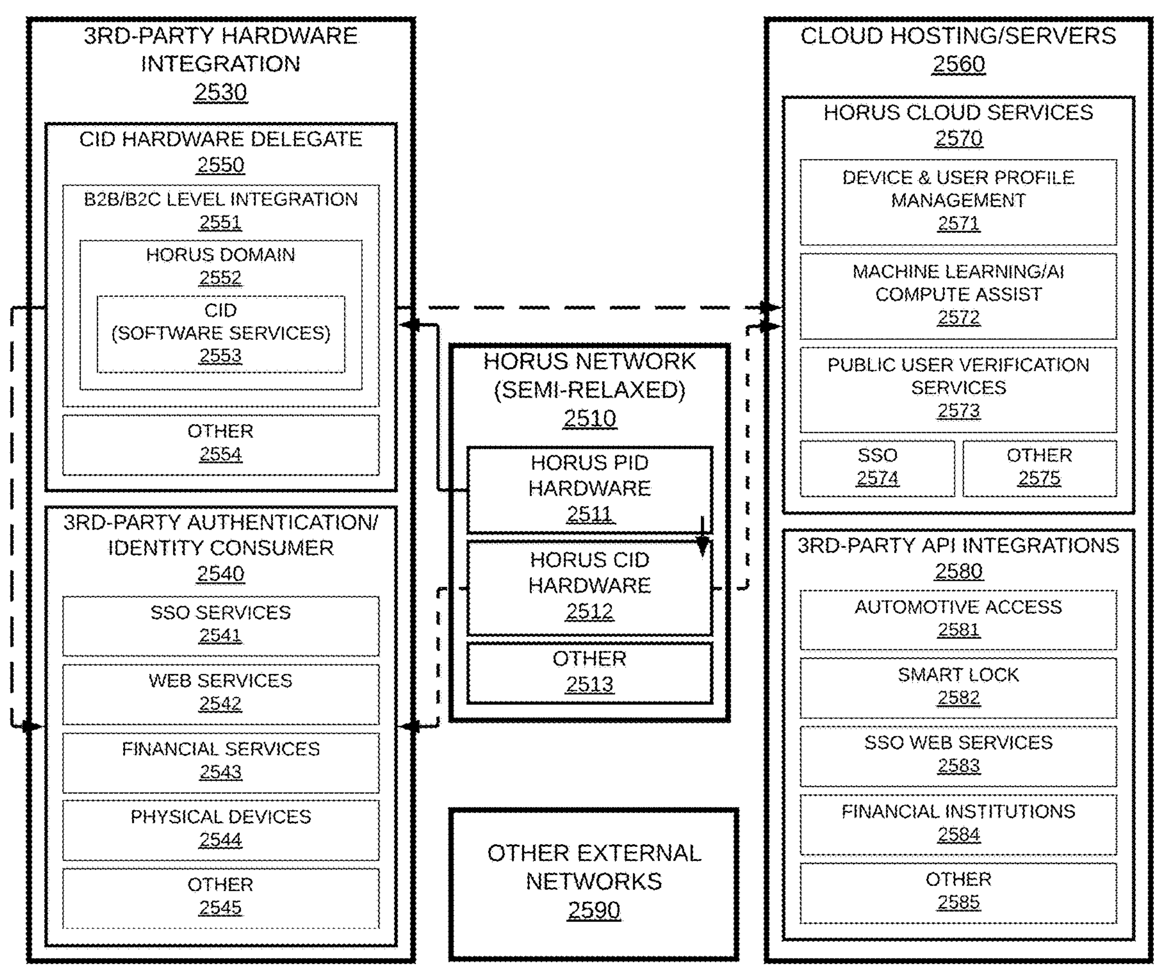
FIG. 25A shows a network architecture block diagram of a semi-relaxed network embodiment of a biometric authentication system.

FIG. 25A shows a network architecture block diagram of a semi-relaxed network embodiment of a biometric authentication system operated by an entity. In a semi-relaxed embodiment of a biometric authentication system, a PID 2511 can communicate with either HORUS CID hardware 2512 or a CID hardware delegate 2550. A CID hardware delegate 2550 comprises business-to-business or business-to-consumer integration on a 3rd-party device. The 3rd-party device would run a software CID 2553 within a secure sector of the device. This allows a biometric authentication system to function without requiring HORUS specific CID hardware. Running the software CID 2553 on a 3rd-party device potentially introduces a vulnerability into a biometric authentication system. Because of this, software CIDs are only permitted on semi-relaxed and relaxed networks. In a semi-relaxed network, CID hardware 2512 and software CIDs 2553 can communicate with 3rd-party authentication/identity consumers 2540 and HORUS cloud services 2570. 3rd-party authentication/identity consumers 2540 may include SSO services 2541, web services 2542, financial services 2543, physical devices 2544, or any other 3rd-party services 2545 requiring authentication. HORUS cloud services 2570 may include device and user profile management 2571, machine learning/AI compute assist 2572, public user verification services 2573, SSO services 2574, or any other services 2575 running on the HORUS cloud. In some embodiments, CIDs will only be able to communicate with specific 3rd-party authentication/identity consumers 2540 that have been white listed. In a semi-relaxed network embodiment of a biometric authentication system, CID hardware 2512 and software CIDs 2553 are not able to communicate with 3rd-party API integrations 2580 or other external networks 2590.

Figure 25B:
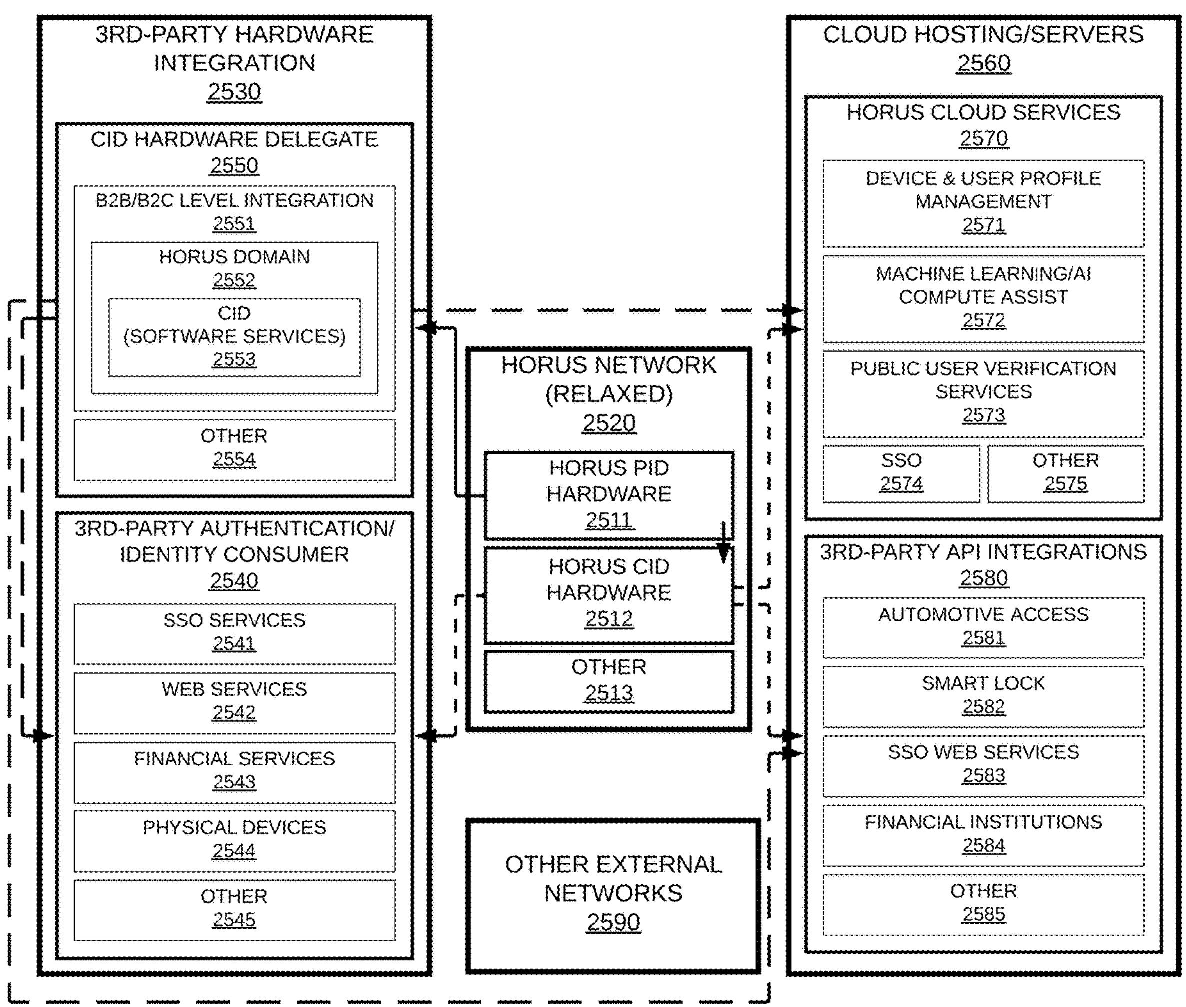
FIG. 25B shows a network block diagram of a relaxed network embodiment of a biometric authentication system.

FIG. 25B shows a network architecture block diagram of a relaxed network embodiment of a biometric authentication system operated by an entity. Unlike in a semi-relaxed network embodiment, a relaxed network embodiment of a biometric authentication system allows CID hardware 2512 and software CIDs 2553 access to 3rd-party API integrations 2580. Such integrations may include automotive access 2581, smart locks 2582, SSO web services 2583, financial institutions 2584, or any other 3rd-party APIs 2585. In some embodiments, CIDs will only be able to access specific 3rd-party APIs 2580 that have been white listed. Access to other external networks 2590 is not allowed in a relaxed network embodiment, just as in a semi-relaxed network embodiment of a biometric authentication system as shown in FIG. 25A.

Figure 26:
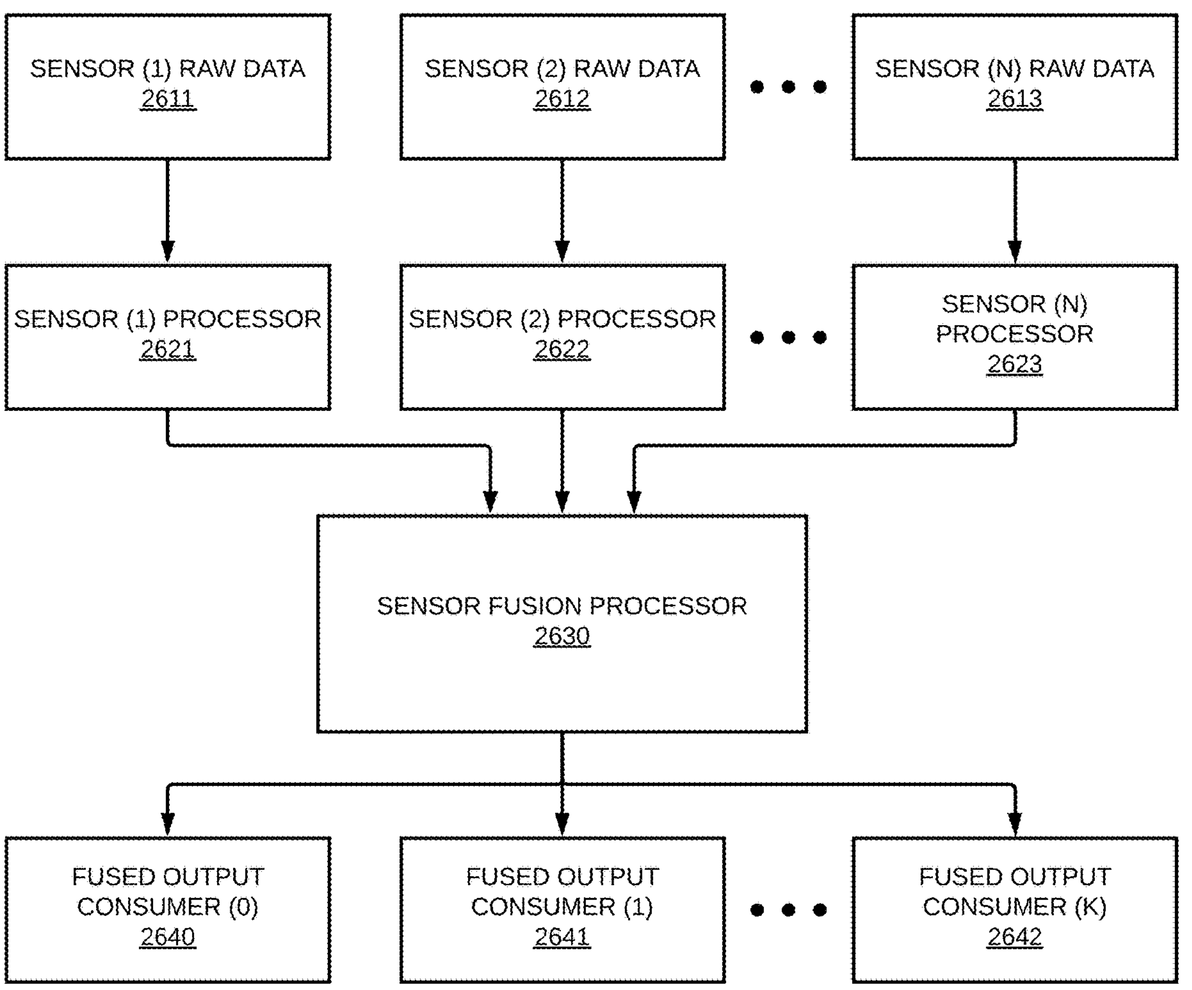
FIG. 26 shows a block diagram of sensor fusion.

FIG. 26 shows a block diagram of sensor fusion. Sensor fusion allows a biometric authentication system to more accurately determine the position of a PID and to generate an authentication mesh. Sensor fusion allows for data from N different sensors to be processed into K fused outputs. This allows for a system to utilize multiple noisy signals to obtain more accurate measurements than any individual signal would allow. Raw sensor data (1) 2611, raw sensor data (2) 2612, up to raw sensor data (N) 2613, are processed in sensor processors 2621, 2622, and 2623. The sensor processors use signal processing techniques to process the raw sensor data before it is sent to a sensor fusion processor 2630. The sensor fusion processor 2630 uses sensor fusion techniques such as Kalman filtering, wavelet analysis, or even neural networks to generate fused data that is then sent to K fused output consumers 2641, 2642, and 2643.

Figure 27:
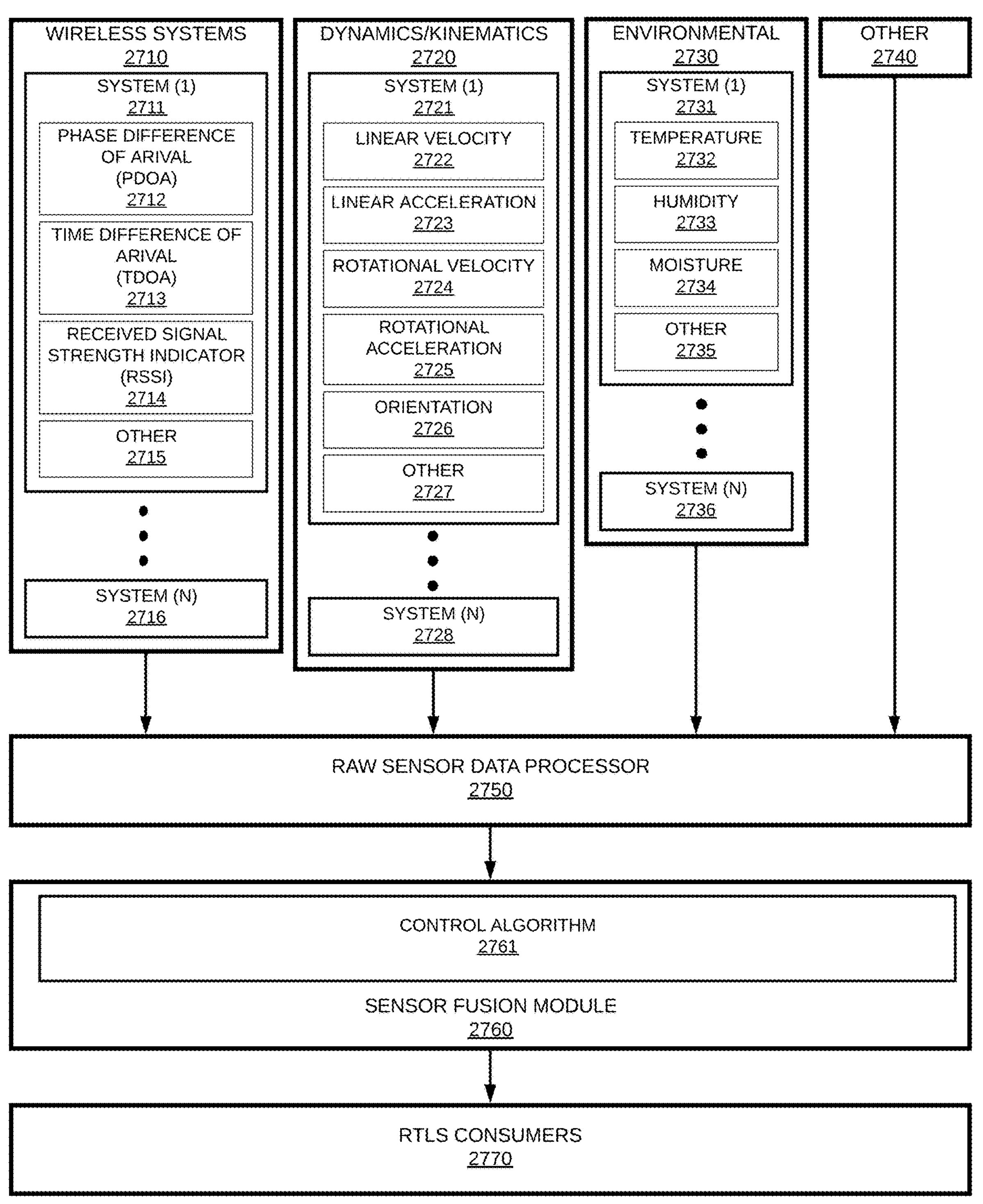
FIG. 27 shows a block diagram of an implementation of sensor fusion in a biometric authentication system.

FIG. 27 shows a block diagram of an implementation of sensor fusion in a biometric authentication system. In a biometric authentication system, sensor fusion is used to generate an authentication mesh from sensor data from N wireless systems 2710, N dynamics/kinematics sensors 2720, N environmental sensors 2730, and other sensor systems 2740. Data from each wireless system 2711 and 2716 may include phase difference of arrival data 2712, time difference of arrival data 2713, received signal strength indicators 2714, or other wireless system data 2715. Data from each dynamics/kinematics system 2721 and 2728 may include linear velocity data 2722, linear acceleration data 2723, rotational velocity data 2724, rotational acceleration data 2725, orientation data 2726, or other dynamics or kinematics data 2727. Data from each environmental system 2731 and 2736 may include temperature data 2732, humidity data 2733, moisture data 2734, or other environmental data 2735. Other systems 2740 may provide additional data to be used to generate the authentication mesh.

The sensor data is then processed by a raw sensor data processor 2750. In some embodiments of a biometric authentication system, multiple raw sensor data processors are utilized. The processed sensor data is then sent to a sensor fusion module 2760. Sensor fusion module 2760 includes one or more control algorithms 2761 which fuse the processed sensor data into an authentication mesh that is provided to RTLS consumers 2780. In some embodiments of a biometric authentication system, multiple sensor fusion modules 2760 are utilized to fuse the processed sensor data. In some embodiments of a biometric authentication system, the control algorithms used to fuse the processed sensor data include Kalman filters, neural networks, and wavelet analysis algorithms.

An authentication mesh allows a biometric authentication system to continuously authenticate and authorize a user utilizing multiple factor verification. An authentication mesh utilizes both a physical token and biometric identification to enhance security. Real-time position tracking allows an authentication mesh to vary the level of authentication required based on external factors. For example, a CID may open an elevator door for a user at a given confidence of biometric identification, however a CID at a lab door could require a higher level of confidence in the biometric identification. The real-time position tracking further enhances security by automatically de-authorizing a user when they leave a preconfigured secured area. This improves both security and the user experience when compared to periodic re-authentication check-ins or automatic de-authorization timers.

An authentication mesh could additionally be used to increase security by combining multiple biometric sensors to obtain a more precise authentication determination than any single type biometric measurement.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A method comprising:

detecting, by a client interface device, an interaction between a personal identification device worn by a device wearer and the client interface device;

verifying, by the client interface device, an identity of the personal identification device using a cryptographic challenge-response protocol;

determining, by the client interface device, a position of the personal identification device relative to the client interface device by measuring at least one of: time difference of arrival or phase difference of arrival of wireless signals exchanged between the personal identification device and the client interface device;

determining whether the personal identification device is within a configurable predetermined area relative to the client interface device based on the determined position;

transmitting, by the client interface device, an authentication request to the personal identification device in response to the personal identification device being within the configurable predetermined area;

generating, by the personal identification device, biometric information of the device wearer using a set of one or more biometric sensors of the personal identification device in response to receiving the authentication request;

comparing, by the personal identification device, the biometric information of the device wearer to biometric information stored in a secure region of the personal identification device;

transmitting, from the personal identification device to the client interface device, an authentication result based on the comparison of the biometric information of the device wearer to the stored biometric information;

transmitting, by the client interface device to an external system, an access grant based on the authentication result;

continuously monitoring, by the client interface device after transmitting the access grant, the position of the personal identification device relative to the client interface device by measuring at least one of time difference of arrival or phase difference of arrival of wireless signals exchanged between the personal identification device and the client interface device;

detecting, by the client interface device, when the personal identification device is not within the configurable predetermined area relative to the client interface device; and transmitting, by the client interface device, a de-authentication instruction to the external system in response to detecting that the personal identification device is not within the configurable predetermined area.

2. The method of claim 1, wherein the biometric information comprises vein signature information of the device wearer.

3. The method of claim 1, wherein the biometric information is generated using one or more of magnetic, thermal, acoustic, or optical sensing.

4. The method of claim 1, wherein the biometric information is generated in response to the client interface device transmitting the authentication request to the personal identification device.

5. The method of claim 1, wherein the stored biometric information is associated with the device wearer, and wherein the personal identification device obtains the stored biometric information before the personal identification device is used to authenticate the device wearer.

6. The method of claim 1, wherein the personal identification device has the secure region and a non-secure region, wherein the stored biometric information is stored in the secure region and is never communicated out of the personal identification device.

7. The method of claim 1, wherein the personal identification device is a ring wearable by the device wearer.

8. The method of claim 1, wherein the comparison of the biometric information of the device wearer to the stored biometric information involves extracting identifying features from sensor data obtained from one or more of the biometric sensors and comparing the identifying features to the stored biometric information.

9. An apparatus comprising:

a personal identification device comprising:

a set of one or more biometric sensors; and a processing system coupled to the set of biometric sensors, wherein the processing system stores a biometric identifier, and wherein in response to receiving an authentication request, the processing system obtains biometric information using the set of biometric sensors, compares the biometric information to the biometric identifier, and transmits an authentication result; and a client interface device comprising:

a positioning sensor configured to determine a position of the personal identification device relative to the client interface device by measuring at least one of time difference of arrival or phase difference of arrival of wireless signals exchanged with the personal identification device;

a communication module configured to communicate with the personal identification device and an external system; and a controller configured to:

verify an identity of the personal identification device using a cryptographic challenge-response protocol;

determine whether the personal identification device is within a configurable predetermined area based on the determined position;

transmit the authentication request to the personal identification device in response to determining that the personal identification device is within the configurable predetermined area;

receive the authentication result from the personal identification device;

transmit an access grant to the external system based on the authentication result;

continuously monitor the position of the personal identification device after transmitting the access grant; and transmit a de-authentication instruction to the external system in response to detecting that the personal identification device is not within the configurable predetermined area.

10. The apparatus of claim 9, further comprising: an enclosure, wherein the set of biometric sensors and the processing system are disposed within the enclosure of the personal identification device.

11. The apparatus of claim 9, wherein the processing system comprises a non-secure region and a secure region, and wherein the biometric identifier is stored in the secure region and is never transmitted out of the secure region.

12. The apparatus of claim 9, further comprising: a wireless charging circuit; and a battery, wherein the battery is charged using the wireless charging circuit, and wherein the battery supplies power to all components of the personal identification device.

13. The apparatus of claim 9, wherein the biometric identifier comprises vein signature information of a user, and wherein the biometric identifier is generated and stored in a secure region before the apparatus operates to authenticate the user.

14. The apparatus of claim 9, wherein the personal identification device is a ring-shaped wearable device worn on a finger of a user.

15. The apparatus of claim 9, wherein the set of biometric sensors is configured to perform one or more of magnetic, thermal, acoustic, or optical sensing.

16. The apparatus of claim 9, wherein the positioning sensor of the client interface device uses Ultra-Wideband (UWB) signals.

17. The method of claim 1, wherein the client interface device checks the personal identification device against a whitelist of authorized devices before transmitting the authentication request.

18. The method of claim 1, wherein the personal identification device only responds to the authentication request from client interface devices with which the personal identification device is enrolled.

19. The method of claim 1, wherein the external system comprises at least one of: a door access system, a vehicle access system, a firearm control system, or a financial transaction system.

20. The apparatus of claim 9, wherein the controller of the client interface device is further configured to check the personal identification device against a whitelist of authorized devices before transmitting the authentication request.

* * * * *